(12) United States Patent
Cavins et al.

(10) Patent No.: US 10,858,131 B2
(45) Date of Patent: Dec. 8, 2020

(54) APPARATUS AND METHOD FOR ACTIVATABLE SUBSTRATE APPLICATION

(71) Applicant: H.B. Fuller Company, St. Paul, MN (US)

(72) Inventors: Orion A. Cavins, Vancouver, WA (US); Jorge A. Nash, Vancouver, WA (US); Matthew D. Lacy, Ridgefield, WA (US)

(73) Assignee: H.B. Fuller Company, St. Paul, MN (US)

( * ) Notice: Subject to any disclaimer, the term of this patent is extended or adjusted under 35 U.S.C. 154(b) by 125 days.

(21) Appl. No.: 16/020,593

(22) Filed: Jun. 27, 2018

(65) Prior Publication Data

US 2019/0002145 A1    Jan. 3, 2019

Related U.S. Application Data

(60) Provisional application No. 62/527,328, filed on Jun. 30, 2017.

(51) Int. Cl.
*B29C 65/20* (2006.01)
*B65B 51/06* (2006.01)
(Continued)

(52) U.S. Cl.
CPC ............ *B65B 51/067* (2013.01); *B31B 50/72* (2017.08); *B31B 50/722* (2017.08); *B65B 7/20* (2013.01);
(Continued)

(58) Field of Classification Search
CPC ..... B65B 51/067; C09J 2201/128; C09J 7/35; B29C 65/20
(Continued)

(56) References Cited

U.S. PATENT DOCUMENTS 2,120,629 A    6/1938  Schunemann
2,538,520 A    1/1951  Holt et al.
(Continued)

FOREIGN PATENT DOCUMENTS

| EP | 0031585 | 7/1981 |
|---|---|---|
| GB | 1519824 | 8/1978 |
| WO | WO 92/20582 | 11/1992 |

OTHER PUBLICATIONS http://www.proshipinc.com/solutions/cvp-500-automated-packing-solution. Website stated Publication date, Mar. 31, 2017.
(Continued)

*Primary Examiner* — Scott W Dodds
(74) *Attorney, Agent, or Firm* — Daniel Barta; Kirsten Stone

(57) ABSTRACT

A method of applying a tape to an article. The method includes contacting a first activatable adhesive composition of an adhesive tape with a placement device. The adhesive tape has a carrier substrate, the first activatable adhesive composition disposed on a first surface of the carrier substrate, and a second activatable adhesive composition disposed on a second surface of the carrier substrate. The method includes activating the first activatable adhesive composition such that the adhesive tape adheres to the placement device through the first activatable adhesive composition, separating the adhesive tape from a tape delivery system, activating the second activatable adhesive composition, contacting an article with the second activatable adhesive composition, and separating the placement device from the adhesive tape such that the adhesive tape remains adhered to the article.

11 Claims, 31 Drawing Sheets

(51) Int. Cl.
  *C09J 7/32* (2018.01)
  *B31B 50/72* (2017.01)
  *C09J 7/35* (2018.01)
  *B65B 7/20* (2006.01)
  *B65D 5/02* (2006.01)
  *B65D 5/54* (2006.01)

(52) U.S. Cl.
  CPC .......... *B65D 5/0236* (2013.01); *B65D 5/545* (2013.01); *C09J 7/32* (2018.01); *C09J 7/35* (2018.01); *B29C 65/20* (2013.01); *C09J 2201/128* (2013.01)

(58) Field of Classification Search
  USPC ........................................ 156/230, 235, 320
  See application file for complete search history.

(56) References Cited

U.S. PATENT DOCUMENTS

| | | | |
|---|---|---|---|
| 2,625,287 A | | 1/1953 | Holt et al. |
| 2,671,159 A | | 3/1954 | O'donnell |
| 2,895,865 A | | 7/1959 | Humphner |
| 2,909,312 A | | 10/1959 | Conerty |
| 3,217,969 A | | 11/1965 | Schmit-Ohlhoff |
| 3,263,900 A | | 8/1966 | Link et al. |
| 3,276,665 A | | 10/1966 | Rasmussen |
| 3,276,666 A | | 10/1966 | Johnson |
| 3,388,639 A | | 6/1968 | Rumberger |
| 3,616,990 A | | 11/1971 | Powell |
| 3,663,269 A | | 5/1972 | Fischer |
| 3,664,222 A | * | 5/1972 | Early .................... B65C 9/1815 83/205 |
| 3,727,750 A | | 4/1973 | Petter |
| 3,808,073 A | | 4/1974 | Navarre |
| 3,850,363 A | | 11/1974 | Jacobs |
| 3,853,261 A | | 12/1974 | Moore |
| 3,884,348 A | | 5/1975 | Ross |
| 4,181,558 A | | 1/1980 | Neubronner |
| 4,351,877 A | | 9/1982 | Williams |
| 4,418,862 A | * | 12/1983 | Vesborg ............... B65D 5/0254 229/110 |
| 4,511,425 A | * | 4/1985 | Boyd ..................... B65C 9/188 100/211 |
| 4,621,736 A | | 11/1986 | Roccaforte |
| 4,773,541 A | | 9/1988 | Riddell |
| 4,778,059 A | | 10/1988 | Martin et al. |
| 4,784,271 A | | 11/1988 | Wosaba et al. |
| 4,795,035 A | | 1/1989 | Kim |
| 4,819,807 A | | 4/1989 | Giger |
| 4,925,521 A | | 5/1990 | Asbury et al. |
| 5,035,328 A | | 7/1991 | Kim |
| 5,050,741 A | | 9/1991 | Kim |
| 5,098,757 A | | 3/1992 | Steel |
| 5,135,790 A | | 8/1992 | Kaplan et al. |
| 5,143,281 A | | 9/1992 | Mainz |
| 5,203,634 A | | 4/1993 | Kim |
| 5,464,151 A | | 11/1995 | Parker et al. |
| 5,605,597 A | | 2/1997 | Plenzler |
| 5,893,514 A | | 4/1999 | Fletcher et al. |
| 6,054,008 A | | 4/2000 | Chan et al. |
| 6,689,244 B2 | | 2/2004 | Schwertfeger |
| 6,713,174 B2 | | 3/2004 | Mitchell |
| 6,991,838 B2 | | 1/2006 | Schwertfeger et al. |
| 7,204,910 B2 | | 4/2007 | Foubert et al. |
| 7,579,573 B2 | | 8/2009 | Kohira et al. |
| 7,731,425 B2 | | 6/2010 | Lin et al. |
| 8,932,725 B2 | | 1/2015 | Koehn et al. |
| 8,932,726 B2 | | 1/2015 | Paolilli et al. |
| 9,296,252 B2 | | 3/2016 | Masecar |
| 9,422,071 B2 | | 8/2016 | Adams |
| 9,434,496 B2 | | 9/2016 | Sytema |
| 2008/0078497 A1 | | 4/2008 | Bradley |
| 2008/0099135 A1 | | 5/2008 | Makar |
| 2010/0055429 A1 | | 3/2010 | Lee et al. |
| 2012/0027986 A1 | | 2/2012 | Husemann |
| 2012/0094042 A1 | | 4/2012 | Lee et al. |
| 2012/0251749 A1 | | 10/2012 | Lee et al. |
| 2013/0000252 A1 | | 1/2013 | Pettersson et al. |
| 2014/0065382 A1 | | 3/2014 | Koehn et al. |
| 2015/0159052 A1 | | 6/2015 | Teng |
| 2015/0197364 A1 | | 7/2015 | Sytema |

OTHER PUBLICATIONS https://www.youtube.com/watch?v=J01y0DMFQMo. Website stated Publication date, Dec. 9, 2015.

* cited by examiner

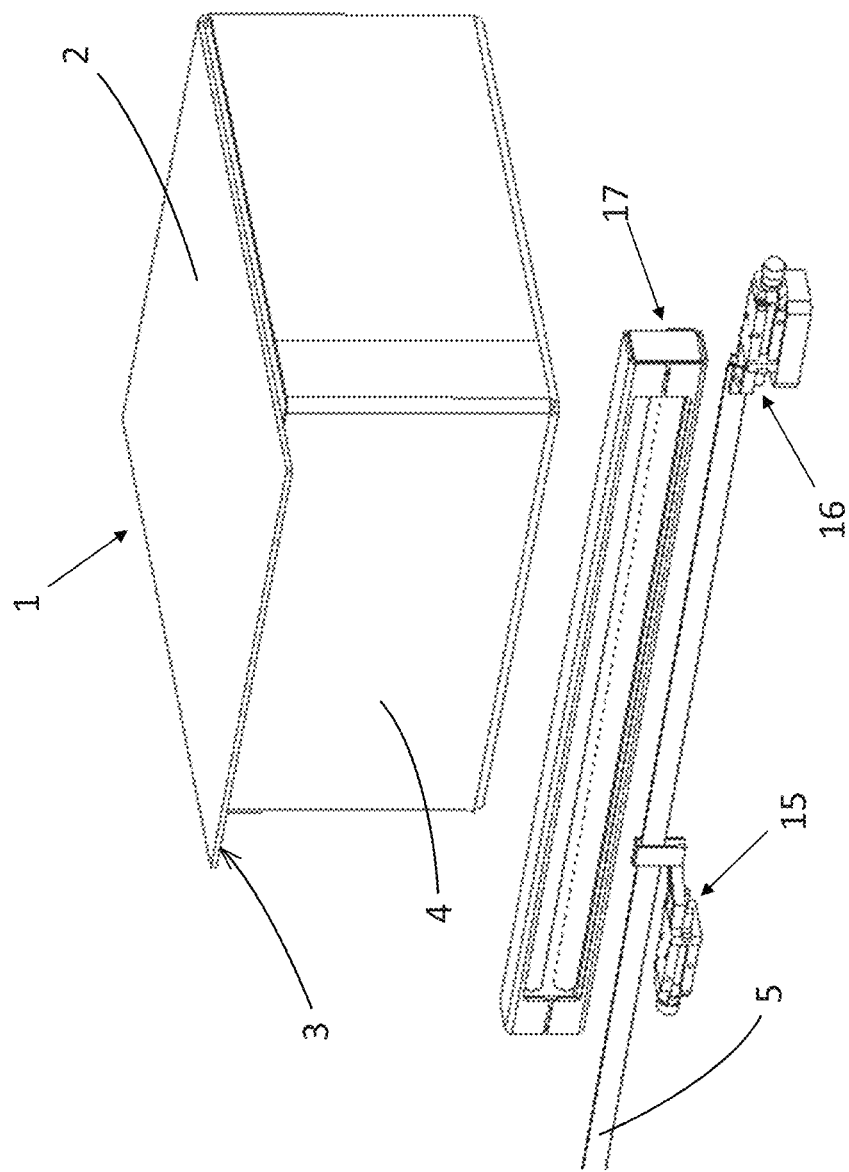

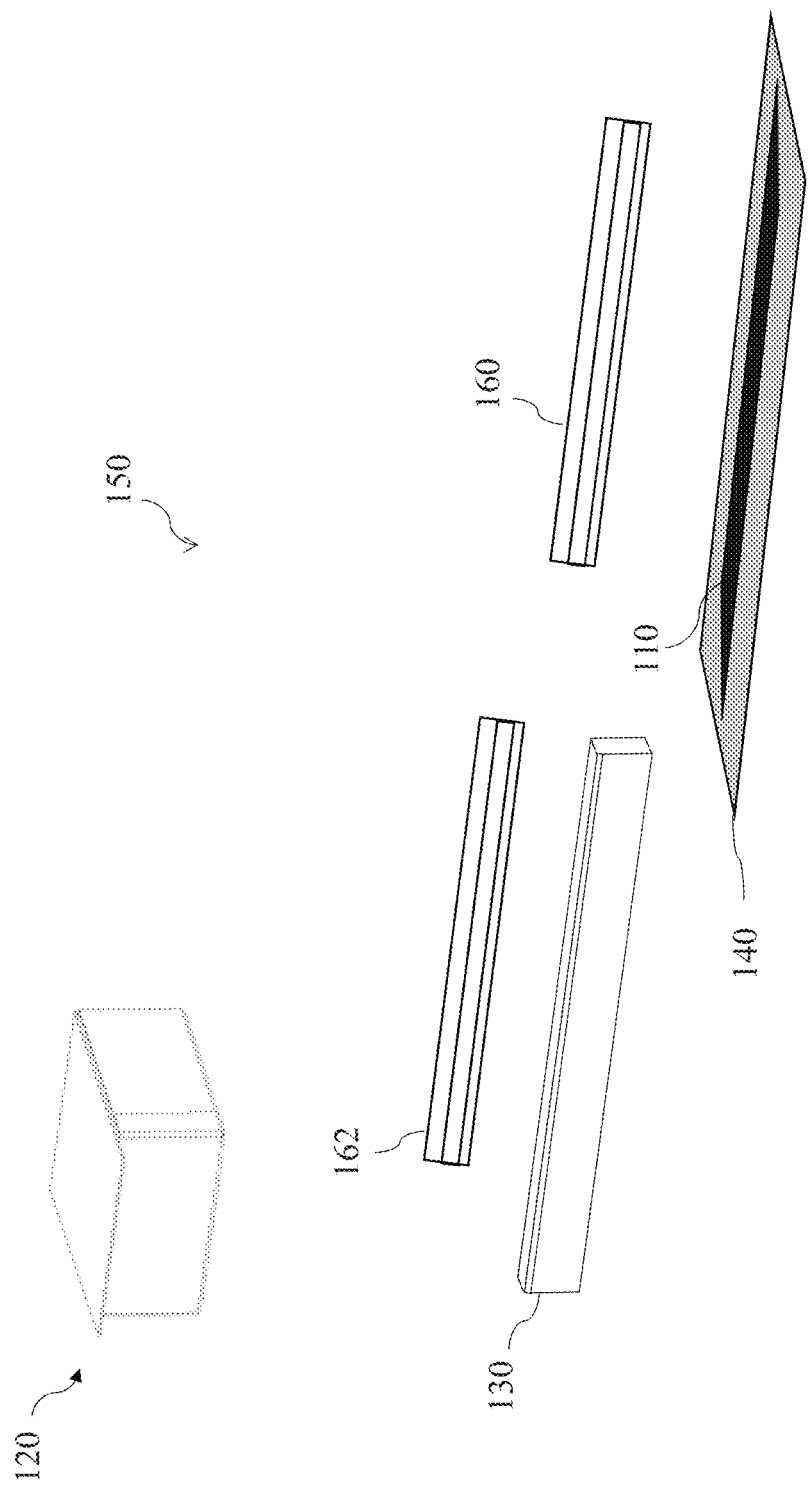

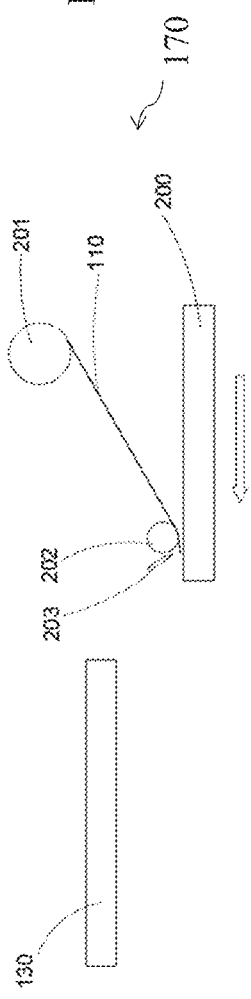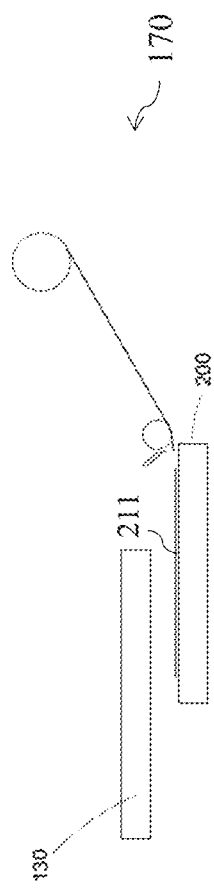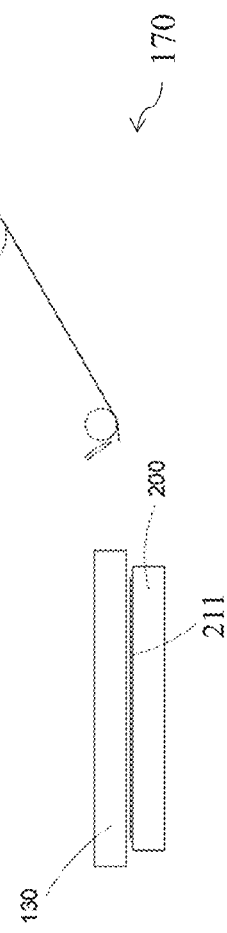

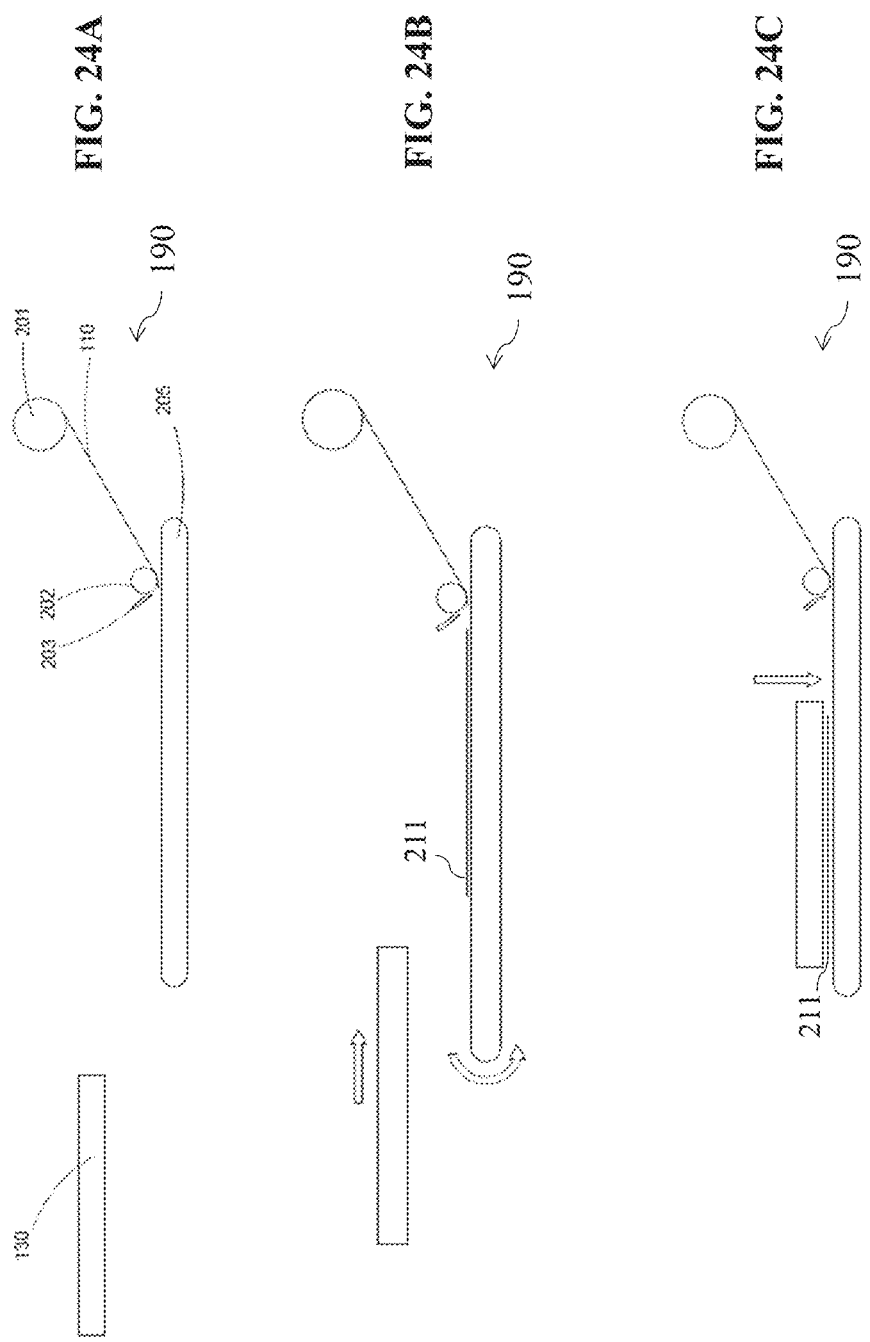

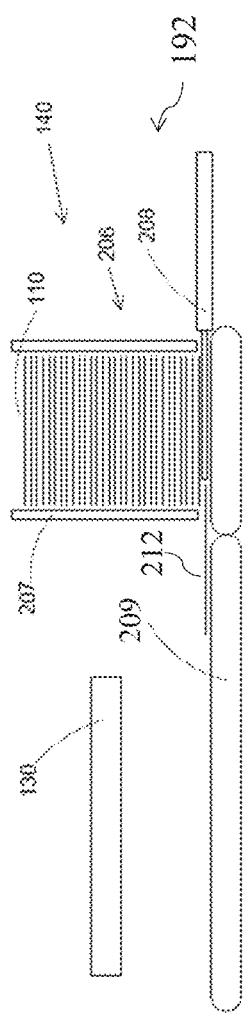
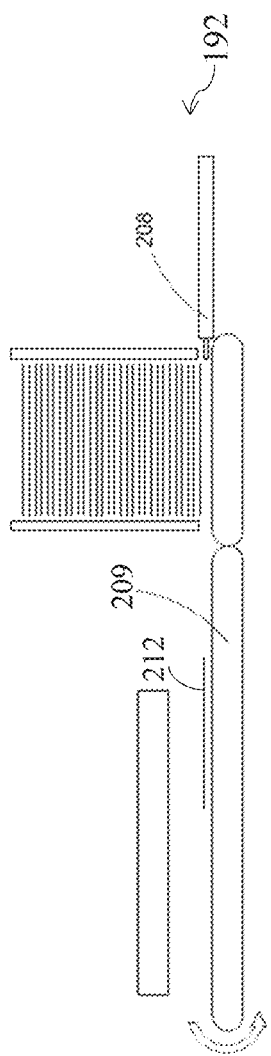
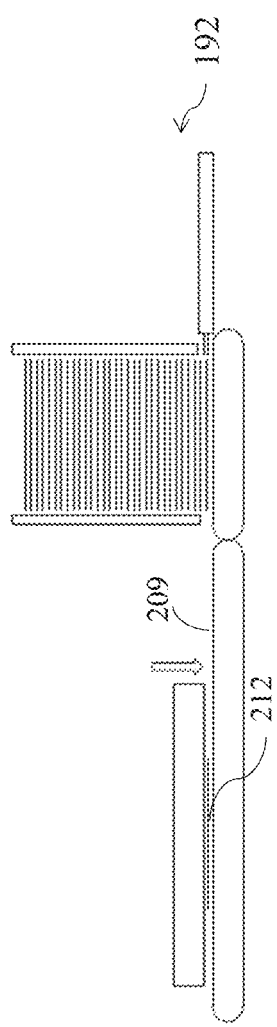
FIG. 25A
FIG. 25B
FIG. 25C

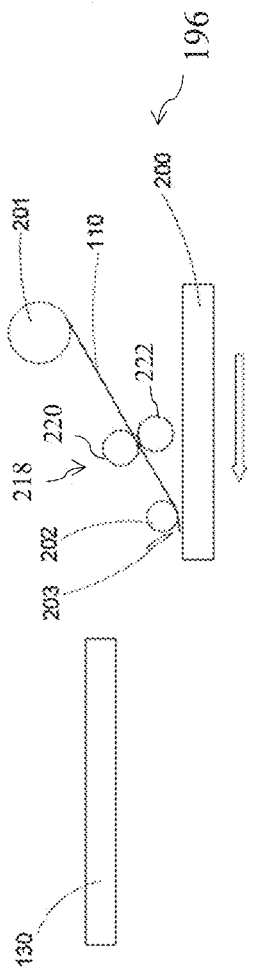
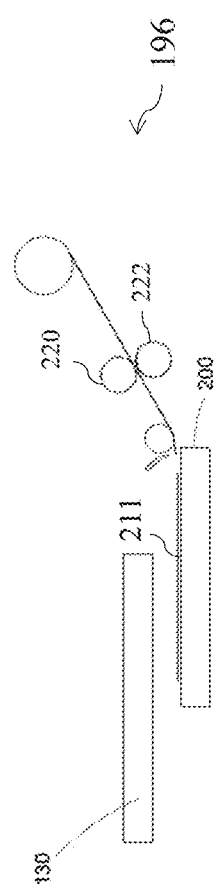
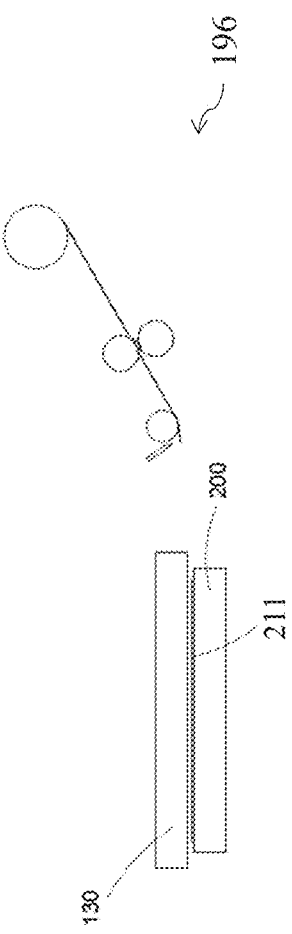
FIG. 27A
FIG. 27B
FIG. 27C

APPARATUS AND METHOD FOR ACTIVATABLE SUBSTRATE APPLICATION

CROSS-REFERENCE TO RELATED APPLICATIONS

This application claims priority to U.S. Provisional Patent Application No. 62/527,328, filed Jun. 30, 2017, which is incorporated by reference herein in its entirety.

FIELD

This disclosure relates to systems and methods for applying an adhesive tape. More particularly, disclosed herein are systems and methods for applying an adhesive tape to an article.

BACKGROUND

Certain boxes are produced around an article of commerce on demand in an automated manner. The benefits of these boxes are that they are produced around the article to eliminate air-space, are closed without tape to provide security from tampering, and protect the article from damage. However, limitations of these containers are that they are difficult to open and the method of closure with glue can be difficult to apply. Containers closed with glue do not provide a method of later opening the container, for example, with the glue used to close the container.

There is a need for a system for applying a tape to a container. There is a need for a method of closing a container that provides a method of later opening the container.

SUMMARY

Disclosed herein is a method for applying a tape to an article. The method includes contacting a first activatable adhesive composition of an adhesive tape with a placement device. The adhesive tape has a carrier substrate, the first activatable adhesive composition disposed on a first surface of the carrier substrate, and a second activatable adhesive composition disposed on a second surface of the carrier substrate. The method includes activating the first activatable adhesive composition such that the adhesive tape adheres to the placement device through the first activatable adhesive composition and separating the adhesive tape from a tape delivery system. The method includes activating the second activatable adhesive composition, contacting an article with the second activatable adhesive composition, and separating the placement device from the adhesive tape such that the adhesive tape remains adhered to the article.

In some embodiments, the article is a container having a first panel, a second panel, and a flap contiguous with the first panel, and an article with the second activatable adhesive composition includes contacting at least one of the second panel and the flap with the second activatable adhesive composition. In some embodiments, the flap is a closing flap that is adapted to be bonded to the second panel to close the container. In some embodiments, the method includes contacting the first adhesive composition with the other of the second panel and the flap such that the second panel is bonded to the flap through the adhesive tape. In some embodiments contacting the second activatable adhesive composition to the article includes contacting a first surface of the article and a second surface of the article with the second activatable adhesive composition.

In some embodiments separating the adhesive tape from the tape delivery system includes retaining the adhesive tape on the placement device only by adhesion of the first activatable adhesive composition to a first surface of the placement device. In some embodiments activating the first activatable adhesive composition includes activating the first activatable adhesive composition with the placement device. In some embodiments, the placement device activates the first activatable adhesive composition through direct contact with a heated surface of the placement device. In some embodiments, activating the second activatable adhesive composition includes activating the second activatable adhesive composition with the placement device.

In some embodiments, the method includes activating the first and second activatable adhesive compositions with at least one of ultraviolet light radiation, electron beam radiation, infrared radiation, thermal radiation, hot air, direct contact with a heated surface, chemical additives, and moisture.

Disclosed herein is a method for applying a tape to an article. The method includes contacting an adhesive tape with a placement device. The adhesive tape includes a carrier substrate having a first surface and an opposing second surface, a first activatable adhesive composition disposed on the first surface of the carrier substrate, and a second activatable adhesive composition disposed on the second surface of the carrier substrate. The method includes activating the first activatable adhesive composition with the placement device such that the first surface of the adhesive tape adheres to the placement device through the first activatable composition, activating the second activatable adhesive composition, contacting an article with the second activatable adhesive composition, and separating the placement device from the first activatable adhesive composition such that the second activatable adhesive composition remains in contact with the article and the placement device separates from the adhesive tape.

In some embodiments, the article is a container having a first panel, a second panel, and a flap contiguous with the first panel; and the method further includes contacting at least one of the flap and the second panel with the second activatable adhesive composition, and contacting the other of the flap and the second panel with the first activatable adhesive composition such that the second panel is bonded to the flap through the adhesive tape.

In some embodiments, activating the first activatable adhesive composition and activating the second activatable adhesive composition includes exposing the first and second activatable adhesive compositions to at least one of ultraviolet light radiation, electron beam radiation, thermal radiation, infrared radiation, hot air, direct contact with a heated surface, chemical additives, and moisture. In some embodiments, activating the first activatable adhesive composition includes directly contacting the first activatable adhesive composition with a heated surface of the placement device.

In some embodiments, separating the placement device from the first activatable adhesive composition includes providing positive air pressure between the placement device and the first activatable adhesive composition.

Disclosed herein is a container closing system. The container closing system includes a placement device configured to contact a first activatable adhesive composition of an adhesive tape such that the adhesive tape adheres to the placement device through the first activatable adhesive composition. The adhesive tape includes a carrier substrate, the first activatable adhesive composition disposed on a first surface of the carrier substrate, and a second activatable adhesive composition disposed on a second surface of the carrier substrate. The placement device is configured to contact the adhesive tape to an article. The container closing system includes a tape activation source configured to activate the first and second activatable adhesive compositions.

In some embodiments, the tape activation source is a heated surface of the placement device. In some embodiments, the placement device is configured to retain the adhesive tape on the placement device only by adhesion of the first activatable adhesive composition to a first surface of the placement device.

In some embodiments, the system includes a separation mechanism configured to separate the placement device from the first activatable adhesive composition. In some embodiments, the system includes a separation mechanism configured to separate the placement device from the first activatable adhesive composition with positive air pressure.

In some embodiments, the tape activation source is configured to provide at least one of ultraviolet light radiation, electron beam radiation, infrared radiation, thermal radiation, hot air, a heated surface, chemical additives, and moisture.

In some embodiments, the article is at least one of a box having four side panels, a top end panel, and a bottom end panel; and a bag formed from the first panel joined to the second panel along a portion of a periphery of the first panel and the second panel. In some embodiments, when the article is a box, the placement device is configured to position the adhesive tape on at least one of a side panel and the top end panel. In some embodiments, when the article is a bag, the placement device is configured to position the adhesive tape on at least one of the first panel and second panel.

The foregoing will become more apparent from the following detailed description, which proceeds with reference to the accompanying figures. While multiple embodiments are disclosed, still other embodiments of the present disclosure will become apparent to those skilled in the art from the following detailed description, which shows and describes illustrative embodiments of the disclosure. Accordingly, the drawings and detailed description are to be regarded as illustrative in nature and not restrictive.

BRIEF DESCRIPTION OF THE DRAWINGS

FIGS. 4A-4G illustrate a method for sealing a container, in accordance with some embodiments.

FIG. 20 is schematic view of a system for applying an adhesive tape, in accordance with some embodiments.

FIG. 22A to 22C are schematic views of a delivery system for providing an adhesive tape, in accordance with some embodiments.

FIG. 24A to 24C are schematic views of a delivery system for providing an adhesive tape, in accordance with some embodiments.

FIG. 25A to 25C are schematic views of a delivery system for providing an adhesive tape, in accordance with some embodiments.

FIG. 27A to 27C are schematic views of a delivery system for providing an adhesive tape, in accordance with some embodiments.

GLOSSARY

Figure 1:
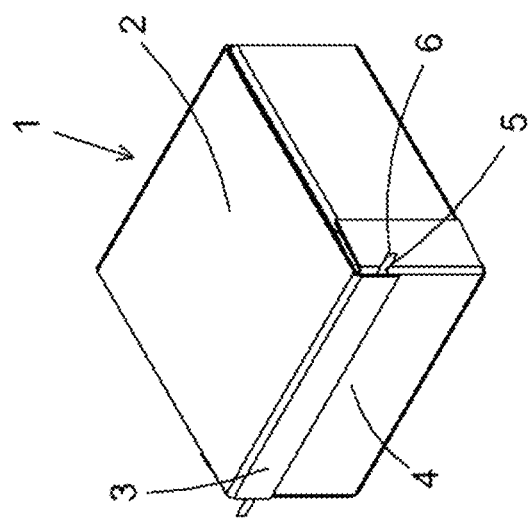
FIG. 1 is a perspective view of an embodiment of a container with a dual function closing/opening tape contacting a surface of one panel of the container.

The term "pressure sensitive adhesive composition" means an adhesive composition that is tacky (i.e. has a loop tack strength of at least 0.5 N as measured by ASTM D6195-(03)) at room temperature (i.e., from about 22° C. to 25° C.).

The term "activatable adhesive composition" means an adhesive composition that becomes tacky when activated.

The terms "closing/opening tape," "dual function closing/opening tape," and "closing and opening tape" each refer to a tape that is configured to adhere to a surface of a container to assist in closing the container, and can be used to subsequently open the container.

DETAILED DESCRIPTION

Disclosed herein are methods, articles, and apparatus that provide a dual function closure/opening system. The tape disclosed herein serves as both a sealing closure and as an opening mechanism. For example, in one embodiment, a single adhesive tape is introduced between a container flap and a container panel and then the container flap and the container panel are pressed together forming a bond between the flap and the panel via the adhesive tape thereby closing the container. In another embodiment, one end of a container includes two overlapping flaps and a single adhesive tape is introduced between the overlap of the two container flaps and then the container flaps are pressed together forming a bond between the flaps via the adhesive tape thereby closing the container. As is evident from above, the methods and apparatus disclosed herein are directed to any container with at least one flap that overlaps a side panel of the container or that overlaps another flap.

In both embodiments, the container can be opened by pulling on the adhesive tape or on an opening tab associated with the tape. In certain embodiments, removal of the adhesive tape when opening the container does not cause substantial structural damage to the container side panel (or inner flap in the two overlapping flaps embodiment) to which the tape is adhered. For example, removal of the adhesive tape when opening the container does not cause the tape to tear an open rift in the container side panel.

In certain embodiments, the adhesive tape can tear through the outside flap but does not cause substantial structural damage to the container side panel (or inner flap in the two overlapping flaps embodiment) to which the tape is adhered. For example, removal of the adhesive tape when opening the container does not cause the tape to tear an open rift in the container side panel. Tearing of the tape through the outside flap is a function of the strength of the tape substrate.

The container may be made from any material such as, for example, paper board, paper, plastic or a combination thereof. In certain embodiments, the container includes at least one side panel or portion, at least one end panel or portion, and at least one overlapping flap. The container has an interior volume defined by inside surfaces of side, end and flap. The side, end and/or flap also have an external surface facing away from the interior volume of the container.

In certain embodiments, the container is a paper board container that includes at least one paper board side panel or portion, at least one paper board end panel or portion, and at least one paper board flap.

In certain embodiments, the set bond strength of the first adhesive composition to the inside panel or flap does not substantially exceed the strength of the internal bond strength of the corrugated board of the inside panel or flap.

In certain embodiments, the tape is applied adjacent to a perforated line in the flap and pulling on the tape detaches the flap via the perforated line. In certain embodiments, removal of the adhesive tape when opening the container does not cause substantial structural damage to the container side panel (or inner flap in the two overlapping flaps embodiment) to which the tape is adhered. For example, removal of the adhesive tape when opening the container does not cause the tape to tear an open rift in the container side panel.

In general, the tape retains its unitary structure when the tape is removed during opening of the container. However, in certain embodiments a residual amount of the adhesive composition may remain on the exterior surface of the corrugated board panel (or inner flap in the two overlapping flaps embodiment) after the tape is removed.

In certain embodiments, the tape can be applied adjacent to, a container joint (e.g., the joint formed by overlapping flaps).

In certain embodiments of the methods disclosed herein, the containers for sealing are presented in a continuous, semi-continuous, or discrete manner on an assembly line or a stand-alone machine.

The methods can include activating the tape. The tape can be activated at the physical space where the tape is applied to the container. For example, the tape can be activated by exposing at least one of the activatable adhesive compositions to an activation source such as a heat source or a moisture source. In certain embodiments, the heat source is a heater. Illustrative heaters include radio frequency, convection, ultrasonic, infrared, or inductive heaters. In certain embodiments, the tape can be conveyed between two fixed heated plates for activation. In certain embodiments, the moisture source is a mechanical source such as a water sprayer or a wetted roller(s) or brush(es).

In certain embodiments, the tape may be activated prior to contacting the tape to a panel or flap (e.g., a paper board panel or flap). For example, the tape is activated prior to positioning the tape into a desired location proximate to the surface of the paper board side panel or to the surface of the paper board opening/closing flap. In other embodiments, the tape may be activated after contacting the tape to a panel or flap (e.g., a paper board panel or flap). In further embodiments, the tape may be activated after it is placed between the paper board side panel and the paper board opening/closing flap or after it is placed between the paper board opening/closing flaps. Activating the adhesive composition develops green bond strength enabling initial adhesion of the tape to the container surface (e.g., a paper board surface).

After the tape has been activated, the container surface (e.g., paper board surface) having the tape disposed thereon can be contacted with the other container surface (e.g., paper board surface). In certain embodiments, the two paper board surfaces with the tape interposed between the surfaces are pressed together thereby completing the bond between the surfaces, resulting in set adhesive compositions (i.e., the adhesive bond strength is fully developed) and sealing of the container.

In certain embodiments, the sealing of the container is performed in a single automated operation. In other words, the steps of contacting, activating and bonding of the tape are initiated and completed within a short time period. For example, the time period may be less than 7 seconds, more particularly less than 5 seconds, and most particularly less than 3 seconds.

In certain embodiments, establishment of a sufficient adhesive bond between the tape and the exterior surface of the container side panel (or the second flap) can be determined by testing whether or not there is partial fiber pull of the paper board when the tape is removed during testing. Presence of a partial fiber pull of the paper board is indicative of sufficient adhesive strength. In certain embodiments, the sealed container is subjected to a prolonged period of heat to observe whether or not the container opens (e.g., via adhesive failure). For example, the sealed container may be placed in an oven for a certain number of days (e.g., at least three, four or five days) at a temperature (e.g, at least 40° C., more particularly at least 50° C., and most particularly at least 60° C.) elevated above room temperature.

In some embodiments, the tape includes a carrier substrate having a first surface and an opposing second surface. The carrier substrate can be film, fiber, paper or a combination thereof. The tape substrate may be in the form of a woven or nonwoven web, a film (including a fiber reinforced film), a multifilament yarn, a monofilament, a cellulosic substrate, or any combination thereof. The web, film or fiber may comprise polyester, polypropylene, polyethylene, polyamide (e.g., aromatic polyamide such as KEVLAR fiber from E.I. du Pont or nonaromatic polyamide such as nylon), fiberglass, natural fibers such as cotton or hemp, and/or other similar materials and combinations thereof. The substrate may be a cellulosic material selected from paper, a paper/polymeric film laminate, or a fiber-reinforced paper. The fibers of the substrate may be continuous strands (e.g., a multifilament yarn or a monofilament) unidirectionally oriented in a direction parallel to the length of the tape. In certain embodiments the fibrous material is polyester fiber. In certain embodiments, the carrier substrate is a single layer of material.

A first activatable adhesive composition can be disposed on the first surface and a second activatable adhesive composition can be disposed on the second surface. In certain embodiments, the first activatable adhesive composition is disposed on the entire surface area of the first surface. In certain embodiments, the second activatable adhesive composition is disposed on the entire surface area of the second surface.

In certain embodiments, the first activatable adhesive composition is disposed on only a portion of the surface area of the first surface. For example, the first activatable adhesive composition may be disposed in a pattern or noncontiguous manner on the first surface.

In certain embodiments, the second activatable adhesive composition is disposed on only a portion of the surface area of the second surface. For example, the second activatable adhesive composition may disposed in a pattern or noncontiguous manner on the second surface.

As used herein, an activatable adhesive composition refers to an adhesive composition whose adhesive properties are activated from an externally present source such as heat or moisture. For example, activation allows a hot melt adhesive to reversibly transition from a solid inert state to a state of semi-liquidity wherein substrate penetration and bonding can occur. Activation of a hot melt adhesive involves several properties including tack, softening point, and set time. Softening point describes the temperature at which an adhesive starts to turn from solid to liquid. Tack is the temperature or temperature range an adhesive can hold a substrate in place until it sets. Set time is the amount of time from when two substrates are contacted with each other until they are bonded sufficiently. Open time is the amount of time from adhesive application onto a substrate until a point at which it will no longer produce an acceptable bond when contacted with another substrate. A "pressure sensitive adhesive" (i.e. an adhesive composition that has a loop tack value of at least 0.5 N as measured by ASTM D6195-(03) at room temperature (i.e. from about 22° C. to 25° C.)) is not an activatable adhesive. In certain embodiments, at least one, and preferably both, activatable adhesive compositions are heat-activatable.

Illustrative heat-activatable adhesive compositions include heat-activatable hot melt adhesives. Hot melt adhesives are adhesives that are applied at an elevated temperature and achieve a final state and resultant strength by cooling, as contrasted with other adhesives which are applied at room temperature and achieve the final state through evaporation of water or solvents.

There is a wide variety of ingredients that go into making a hot melt adhesive. The formulator has a wide selection of polymers and usually low-molecular weight, natural and synthetic waxes; and tackifying resins to choose from.

Useful tackifying resins include natural and modified rosins such as gum rosin, wood rosin, tall oil rosin, distilled rosin, hydrogenated rosin, dimerized rosin and polymerized rosin; rosin esters such as glycerol and pentaerythritol esters of natural and modified rosins including, e.g., glycerol esters of pale, wood rosin, glycerol esters of hydrogenated rosin, glycerol esters of polymerized rosin, pentaerythritol esters of hydrogenated rosin and phenolic-modified pentaerythritol esters of rosin; phenolic modified terpene or alpha methyl styrene resins and hydrogenated derivatives thereof; aliphatic petroleum hydrocarbon resins; aromatic petroleum hydrocarbon resins, and mixed aromatic and aliphatic hydrocarbon resins and the hydrogenated derivatives thereof; aromatic or phenol modified alicyclic petroleum hydrocarbon resins and the hydrogenated derivatives thereof; alicyclic petroleum hydrocarbon resins and the hydrogenated derivatives thereof; styrenated terpenes; phenol-formaldehyde tackifying resins and combinations thereof.

Useful waxes include paraffin waxes, Fischer-Tropsch waxes, by-product polyethylene waxes, high-density low molecular weight polyethylene waxes, propylene based waxes, microcrystalline waxes, and vegetable waxes.

In order to be converted to more useful adhesives, higher molecular weight polymers can be blended therewith. Higher molecular weight polymers, which are typically blended with the natural and synthetic waxes and resins to toughen or reinforce the same, include polyamides, ethylene homopolymers, copolymers and terpolymers (e.g. copolymers of ethylene and vinyl acetate and metallocene catalyzed ethylene copolymers), polyester block polymers, styrene block copolymers (e.g. styrene-butadiene-styrene, styrene-isoprene-styrene or styrene-polyolefin-styrene), polypropylene based homopolymers, copolymers and terpolymers (e.g. static amorphous polypropylene and metallocene catalyzed polypropylene based homopolymers and copolymers), ethyl cellulose, acrylates and methacrylates, and polystyrene, etc, and combinations thereof.

While hot-melts are usually a blended mixture of various polymers, it should be understood that any one of the above-mentioned ingredients may be used singly or in combination depending upon the properties desired. In addition, the hot melt adhesives may contain plasticizers, pigments, dyes, UV and thermal stabilizers, fillers and antioxidants.

In certain embodiments, the adhesive compositions may include 20-50 wt. % ethylene copolymer (based on the total dry weight percentage of the adhesive composition), and a tackifying resin component selected from a group consisting of a hydrocarbon tackifying resin, a rosin ester tackifying resin and a mixture thereof. In certain embodiments, the adhesive compositions include 20-60 wt. % hydrocarbon tackifying resin/rosin ester tackifying resin, and 20-40 wt. % terpene phenolic tackifying resin or an equivalent, based on the total dry weight percentage of the adhesive composition. The compositions may also optionally include 5-40 wt. % of a wax compatible with the ethylene copolymer and 0.1-2 wt. % of a stabilizing additive.

In certain embodiments, the adhesive compositions may include from 20% by weight to 50% by weight ethylene copolymer (based on the total dry weight percentage of the adhesive composition), and a tackifying resin component selected from a group consisting of a hydrocarbon tackifying resin, a rosin ester tackifying resin and a mixture thereof. In certain embodiments, the adhesive compositions include from 20% by weight to 60% by weight hydrocarbon tackifying resin/rosin ester tackifying resin, and from 20% by weight to 40% by weight terpene phenolic tackifying resin or an equivalent, based on the total dry weight percentage of the adhesive composition. The compositions may also optionally include from 5% by weight to 40% by weight of a wax compatible with the ethylene copolymer and from 0.1% by weight to 2% by weight of a stabilizing additive.

Representative ethylene copolymers include ethylene-vinyl ester copolymers wherein the vinyl ester comonomer is typically a C2-C6 ester, for example, vinyl acetate, methylacrylate, methyl-methacrylate, ethylacrylate, 2-ethylhexyl acrylate, butylacrylate or acrylic acid. Typically the ester content will be from about 18% by weight to 40% by weight, or even from about 25% by weight to 35% by weight. The melt index ("MFI") (gram flow/10 min., ASTM D 1238—82 Cond. E) will typically range from 2 g/10 min to 2500 g/10 min, from 6 g/10 min to 500 g/10 min, or even from 6 g/10 min to 400 g/10 min. The ethylene-vinyl ester copolymer can be either of the high or low alkyl-branch containing copolymers conventionally known in the art. Useful commercially available ethylene-vinyl ester copolymers include ESCORENE, UL 7760 ethylene vinyl acetate (EVA) (MFI=5.7, vinylacetate content of 26.7% by weight) from Exxon Chemical Company, ATEVA 2810A from AT Plastics, and ELVAX 260 from DuPont. The ethylene copolymer component makes up a principal part of the adhesive composition. Typically that amount will be greater than about 20% by weight, based on the total blend weight, preferably greater than about 25% by weight, and most preferably greater than about 40% by weight. The amount is typically less than about 50% by weight, preferably 45% by weight, or lower. Thus an amount from 30% by weight to 45% by weight will be particularly useful.

The hydrocarbon tackifying resins and terpene phenolic tackifying resin include any of those that are compatible with EVA. Rosin esters tackifying resins may also be used. For example the C5/C9 resins, any of the C4, C5 and/or C6, and/or terpene, containing resins that also contain a significant portion of C8, C9 and/or C10 monomers, e.g., styrene or alkyl-substituted styrene monomers will be suitable. Such are available commercially as nonhydrogenated or hydrogenated hydrocarbon resins prepared by Friedel-Crafts polymerization and if hydrogenated, by conventional metal-catalyzed hydrogenation. Monomers can be provided as pure monomer streams, or pure monomer in solvent, or steam-distilled petroleum fractions, for example, heart cut distillate. Preferred tackifying resins are the aromatic modified aliphatic C5/C9, aromatic modified terpene resins or aromatic aliphatic modified terpene resins prepared with or from steam-cracked petroleum fractions and having number-average molecular weights (Mn) less than or equal to 900, viscosity-average molecular weights (Mz) less than or equal to 3000, a molecular weight distribution (MWD) less than or equal to 2.1, and an aromaticity of 10-40 wt. % aromatic monomers based on total resin number average molecular weight preferably 15-35 wt. %. Resins of similar monomers meeting these physical parameters will be also be particularly suitable. Commercially available resins that are suitable include the SYLVALITE resins of Arizona Chemical Company, particularly the rosin ester resins RE 100F resin products as well as the WESTREZ resins of MeadWestvaco, particularly the 5000 resin products. The most suitable resins have a softening point (Ring & Ball) of 50-120° C., preferably 70-105° C., and most preferably 80-105° C. Below about 50° C. softening point the resins can cause undesirable loss of heat resistance for the adhesive compositions of the invention. The hot melt adhesive compositions of the invention preferably will contain from 30-60 wt. % more preferably 35-45 wt. % tackifying resin. In certain embodiments, the hydrocarbon resin is an aliphatic-aromatic resin having from 10 to 40 wt. %, of total resin number-average molecular weight, of aromatic monomer as measured by NMR.

The compositions may also include antioxidants. The antioxidants, if used, are generally present in amounts of about 0.1 to 1.5 weight percent, preferably 0.25 to 1.0 weight percent. Such antioxidants are commercially available from Ciba-Geigy, Hawthorne, N.Y. and include Irganox® 565, 1010 and 1076 which are hindered phenols. These are primary antioxidants which act as radical scavengers and may be used alone or in combination with other antioxidants such as phosphite antioxidants like Irgafos® 168 available from Ciba-Geigy. Phosphite catalysts are considered secondary catalysts and are not generally used alone. These are primarily used as peroxide decomposers. Other available catalysts are Cyanox® LTDP available from Cytec Industries in Stamford, Conn., and Ethanox® 1330 available from Albemarle Corp. in Baton Rouge, La. Many such antioxidants are available either to be used alone or in combination with other such antioxidants. These compounds are added to the hot melts in small amounts and have no effect on other physical properties. Other compounds that could be added that also do not affect physical properties are pigments which add color, or fluorescing agents, to mention only a couple. Additives like these are known to those skilled in the art. The performance of the antioxidants may be further enhanced by utilizing, in conjunction therewith, known synergists such as, for example, thiodipropionate esters and phosphites. Distearyl thiodipropionate is particularly useful.

Depending on the contemplated end uses of the adhesives, other additives such as plasticizers, pigments, dyestuffs and fillers conventionally added to hot melt adhesives may be included. In addition, small amounts of additional tackifiers and/or waxes such as microcrystalline waxes, hydrogenated castor oil and vinyl acetate modified synthetic waxes may also be incorporated in minor amounts, i.e., up to about 10% by weight, into the formulations of the present invention.

In some embodiments, flow of the adhesive to mate with the substrate is important to adhesion. The selection of the proper tackifying resin(s) and its amount can be a factor in adhesive performance. The selection of the tackifying resin type may also dictate the color and odor characteristics of the resulting adhesive. If a fast setting adhesive is desired at least one wax is also typically used to control set speed and heat resistance. The role of the wax(es) is to increase the crystallinity and modulus of the adhesive blend. Fast set and high heat resistance are typically achieved by the most crystalline waxes with the highest melting point (synthetic waxes). Such waxes, however, may prove undesirable in other areas, however, such as adhesion and cold temperature flexibility. For this reason a variety of synthetic, microcrystalline and paraffin waxes are used for various applications.

Lower heat resistance/slower set may be achieved with lower melt point resins and less crystalline waxes. Although wax primarily will drive the set time of the adhesive, lower or higher melt point resins can modify the crystallinity of an adhesive composition and therefore also adjust set time up or down.

In certain embodiments, the tape has a tensile strength of at least 14 kg/cm of tape width, more particularly at least 23 kg/cm tape width, and most particularly at least 32 kg/cm tape width. In certain embodiments the tape has a weft strength of at least 0.5 kg, more particularly at least 2.3 kg. In certain embodiments the tape applied to a paper board substrate may have a peel strength sufficient to result in paper tear of the paper board substrate (e.g., a minimum peel strength of at least 275 g/cm). In certain embodiments, the tape may have a thickness of 75 to 430 µm, more particularly 230 to 300 µm, prior to adhesion to the paper board. In some embodiments, the tape can have a length longer than its width. In other words, the tape defines a longitudinal axis along a longitudinal direction. In specific embodiments, the width of the tape is 1 mm to 60 mm, more particularly 4 mm to 30 mm, and most particularly 6 to 11 mm.

The tape may be made by applying the adhesives in a molten state to the carrier substrate while the substrate is under tension at a controlled speed. The molten adhesive(s) are allowed to cool and set up as a solid forming a linear unitized tape. The tape production process may include any heating methods known for applying hot melt adhesives.

In certain embodiments, the activatable tape does not include a removable release liner.

In certain embodiments, the container is a paper board article that includes at least one paper board side panel and at least one paper board end panel, wherein there is at least one paper board opening/closing flap contiguous with the at least one end panel. In another embodiment, the container includes at least one paper board end panel, wherein there is a first paper board opening/closing flap contiguous with the at least one end panel and a second paper board opening/closing flap contiguous with the at least one end panel. In certain embodiments, the paper board may be a corrugated paper board. The corrugated paper board includes an exterior liner and a corrugated member. In some implementations, the corrugated paper board consists of a series of parallel flutes. However, in other implementations, the corrugated paper board can include other configurations, such as a waffle-type pattern or honeycomb. The corrugated board may be a single wall structure (i.e., includes a single fluted corrugated medium and at least one liner layer) or a multi-wall structure (i.e., includes at least two fluted corrugated mediums and at least one liner layer). In certain embodiments, the article is a box that has four side panels, a top end panel, and a bottom end panel.

Figure 2:
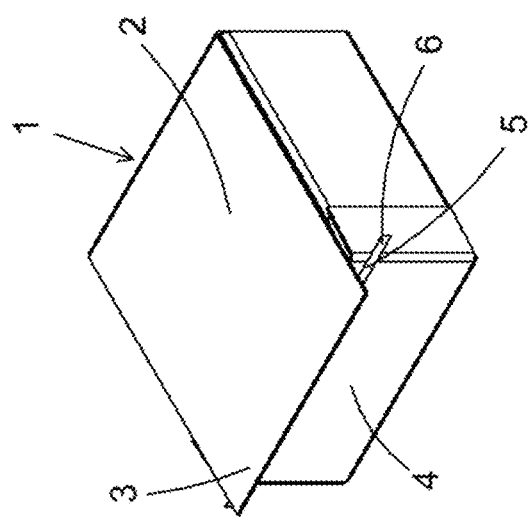
FIG. 2 is a perspective view embodiment of a container with a dual function closing/opening tape interposed between a flap of the container and a panel of the container.

An illustrative container 1 is shown in FIGS. 1 and 2. The container 1 includes a first opening/closing end 2. The opening/closing end 2 include a flap 3 that is contiguous with the end 2 and that extends beyond the edge of the container. The container 1 also includes a side panel 4. The side panel 4 adjoins the opening/closing end 2. The flap 3 can be bent to contact and overlap a top portion of the side panel 4 as shown in FIG. 2. The flap 3 also overlaps the edge created by the adjoining side panel 4 and end 2.

In FIG. 1 a dual function closing/opening tape 5 contacts the exterior surface of the side panel 4. As disclosed herein, the tape 5 is activated so that it has sufficient adhesive green strength so that it is adhesively secured to the exterior surface of the side panel 4. In FIG. 2 the flap 3 is bent over the panel so that tape 5 is interposed between the interior surface of the flap 3 and the exterior surface of panel 4. Final setting of the adhesive compositions carried on the tape seals the container 1 as shown in FIG. 2.

FIGS. 1 and 2 also show an extended end portion 6 of the tape 5 that extends beyond the outer edge of the container. The extended end portion 6 serves as an opening tab for pulling when opening the container. Alternatively, an opening tab may be provided by a tear tab formed in the paper board of the side panel or the flap. For example, the tear tab may have a flared handle portion at its tear-initiating end that enables a user to grip and pull the tear tab. The tear-initiating end of the tear tab may be located at an edge of the paper board. In certain embodiments the tear tab may be made by cutting a profile or pattern that extends through the entire thickness of the paper board and that matches the profile or pattern of the tear tab. The cut for the tear tab is made during the converting of the paper board into a container so that the cut and associated tear tab are present in the finished container made from the corrugated board.

Figure 5:
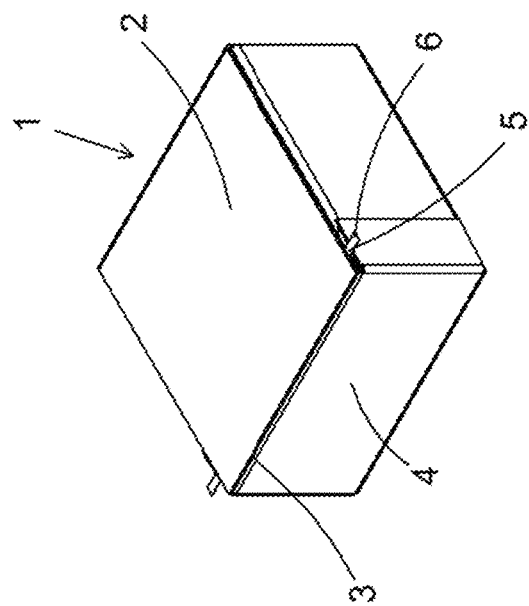
FIG. 5 is a perspective view of an embodiment of a container with a dual function closing/opening tape contacting a surface of a first flap of the container.
Figure 6:
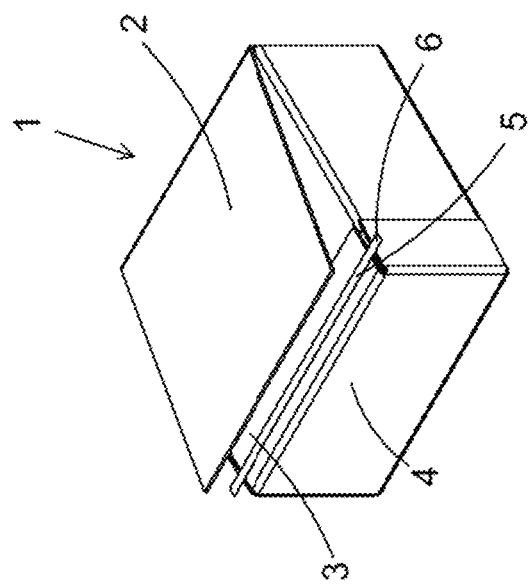
FIG. 6 is a perspective view of an embodiment of a container with a dual function closing/opening tape interposed between a first flap of the container and a second flap of the container.

Another embodiment of an illustrative container is shown in FIGS. 5 and 6. In this embodiment the container 1 includes paper board end first opening/closing flap 2. The container 1 also includes a paper board side panel 4 that includes a second paper board opening/closing flap 3 contiguous with the side panel 4. The side panel flap 3 can be bent so that it is underneath the end flap 2. A portion of the end flap 2 overlaps the side panel flap 3.

In FIG. 5 a dual function closing/opening tape 5 contacts the exterior surface of the side panel flap 3. As disclosed herein, the tape 5 is activated so that it has sufficient adhesive green strength so that it is adhesively secured to the exterior surface of the side panel flap 3. In FIG. 6 the flap 3 is bent under the end flap 2 so that tape 5 is interposed between the exterior surface of the flap 3 and the interior surface of end flap 2. In certain embodiments, the edges of end flap 2 coincide with the edges of the container 1. Final setting of the adhesive compositions carried on the tape seals the container 1 as shown in FIG. 6.

Figure 3:
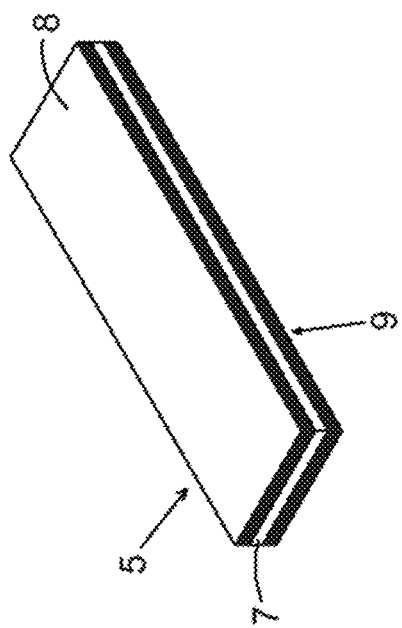
FIG. 3 is a perspective view of a dual function closing/opening tape, in accordance with some embodiments.

An illustrative dual function closing/opening tape 5 is shown in FIG. 3. The tape 5 includes a tape substrate 7 interposed between a layer 8 of a first activatable adhesive composition and a layer 9 of a second activatable adhesive composition. The layer 8 of the first activatable adhesive composition contacts a surface of the substrate 7 and the layer 9 of a second activatable adhesive composition contacts an opposing surface of the substrate 7. The first activatable adhesive composition may have the same or different composition compared to the second activatable adhesive composition. In certain embodiments, the substrate 7 has a thickness of at least 25 µm, more particularly at least 75 µm. In certain embodiments, the substrate 7 has a thickness not greater than 127 µm, particularly 100 µm. In certain embodiments, each of the layer 8 and the layer 9 has a thickness of at least 25 m, more particularly at least 75 µm. In certain embodiments, each of the layer 8 and the layer 9 has a thickness not greater than 150 µm, particularly 100 µm. In certain embodiments, the overall tape 5 has a thickness of at least 75 µm, more particularly at least 225 µm. In certain embodiments, the overall tape 5 has a thickness not greater than 430 µm, particularly 300 µm.

FIGS. 4A-4G illustrate one embodiment of an automated method and apparatus for sealing a container 1. The apparatus includes a first tape retainer 15, a second tape retainer 16, and a heat activator 17. The first retainer 15 and the second retainer 16 may each be a device that can receive, retain and locate the tape 5. Illustrative retainers include an electromechanical gripper or a vacuum retainer, each of which is known in the art.

Figure 4A:
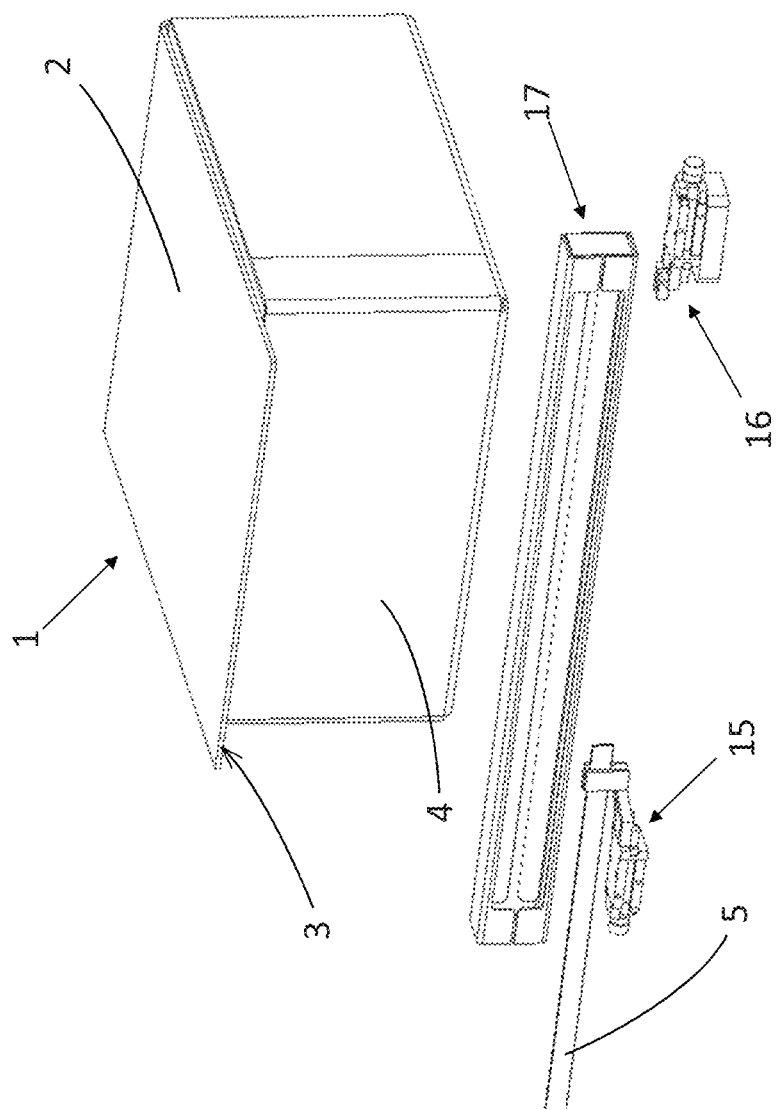

In FIG. 4A first tape retainer 15 and second tape retainer 16 are initially located below the heat activator 17. A tape 5 is fed to the first tape retainer 15 from a tape supply source (tape supply source is not shown). The tape supply source may be a wound roll of tape. The tape 5 is retained by the first tape retainer 15.

Figure 4B:
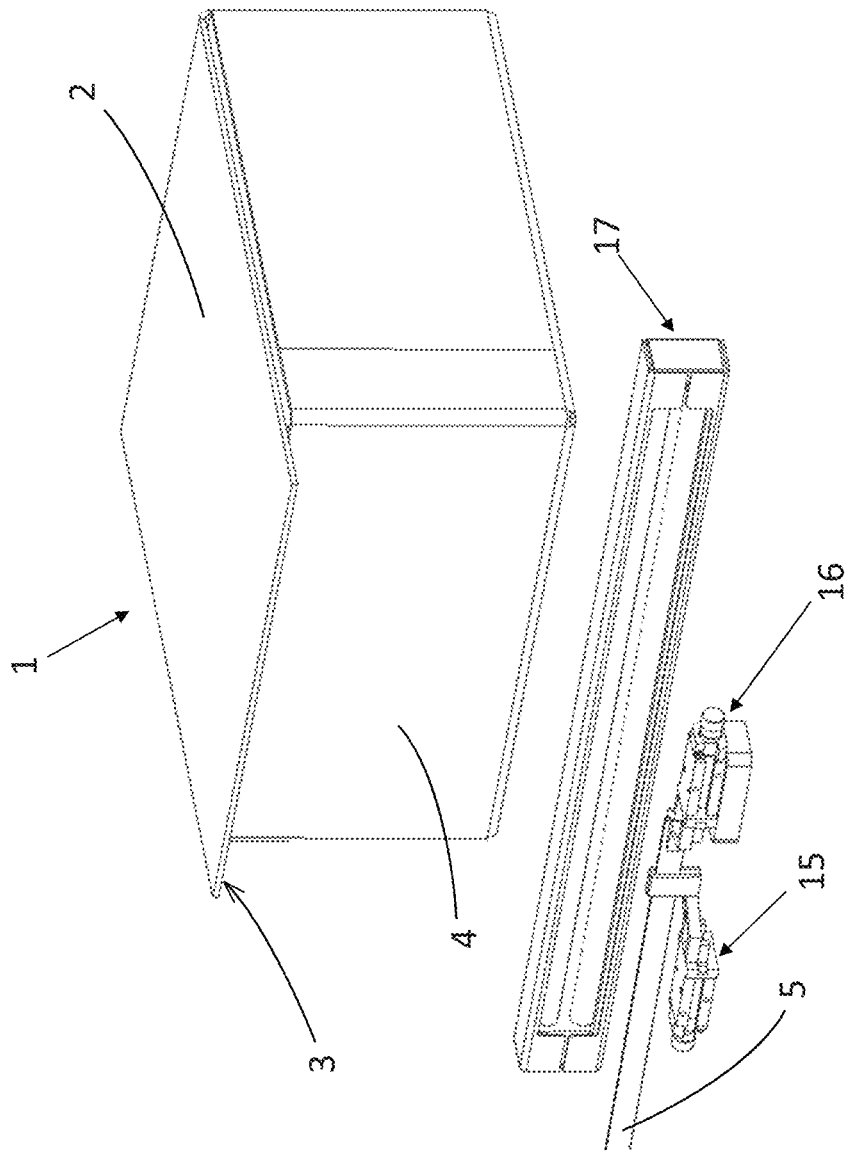

In FIG. 4B the second tape retainer 16 moves toward the first tape retainer 15 and retains a portion of the tape 5 that extends from the first tape retainer 15. The tape 5 thus is simultaneously retained by the first tape retainer 15 and the second tape retainer 16.

In FIG. 4C the first tape retainer 15 release the tape 5 and the second tape retainer 16 moves thereby pulling the tape 5 from the tape source to a predetermined tape length and position.

Figure 4D:
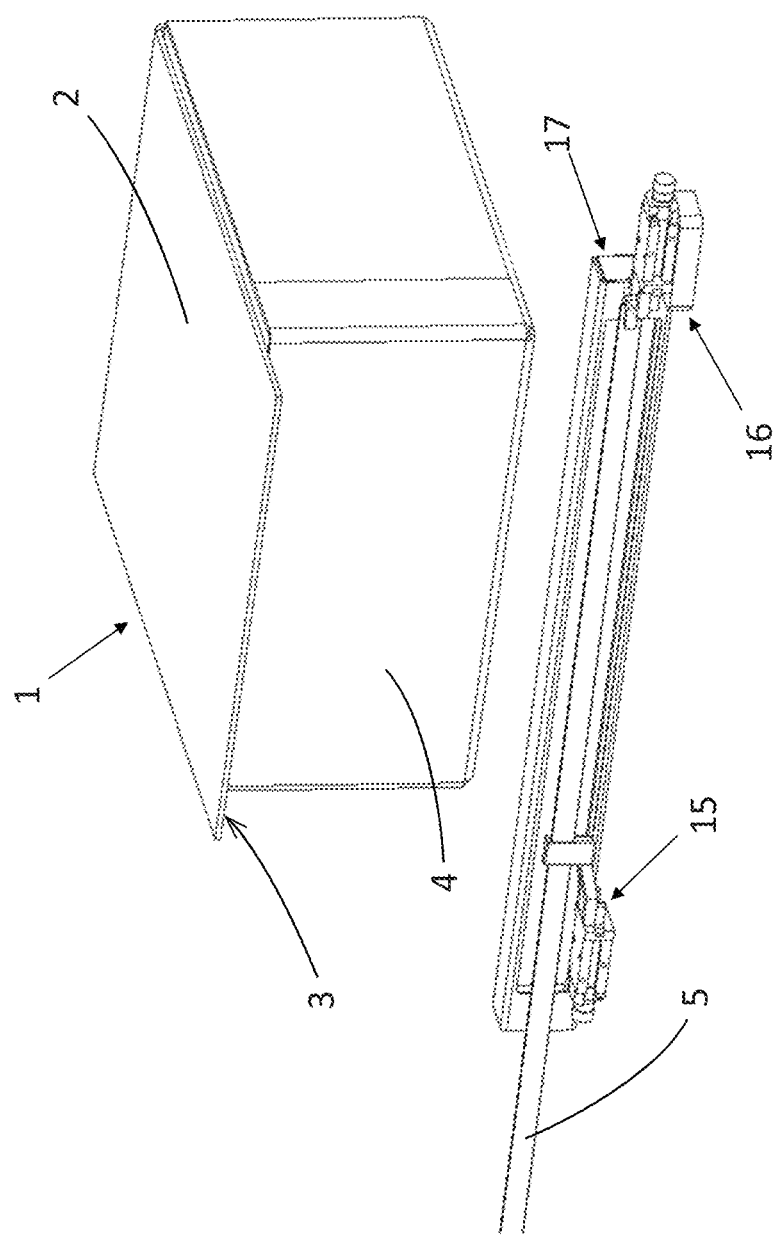

In FIG. 4D the first tape retainer 15 and the second tape retainer 16 move so as to translate the tape 5 across the activation source 17 to activate the activatable adhesive composition without melting the tape. Alternatively, the activation source 17 can move to be proximate to the length of tape 5 while the first tape retainer 15 and the second tape retainer 16 remain stationary.

Figure 4E:
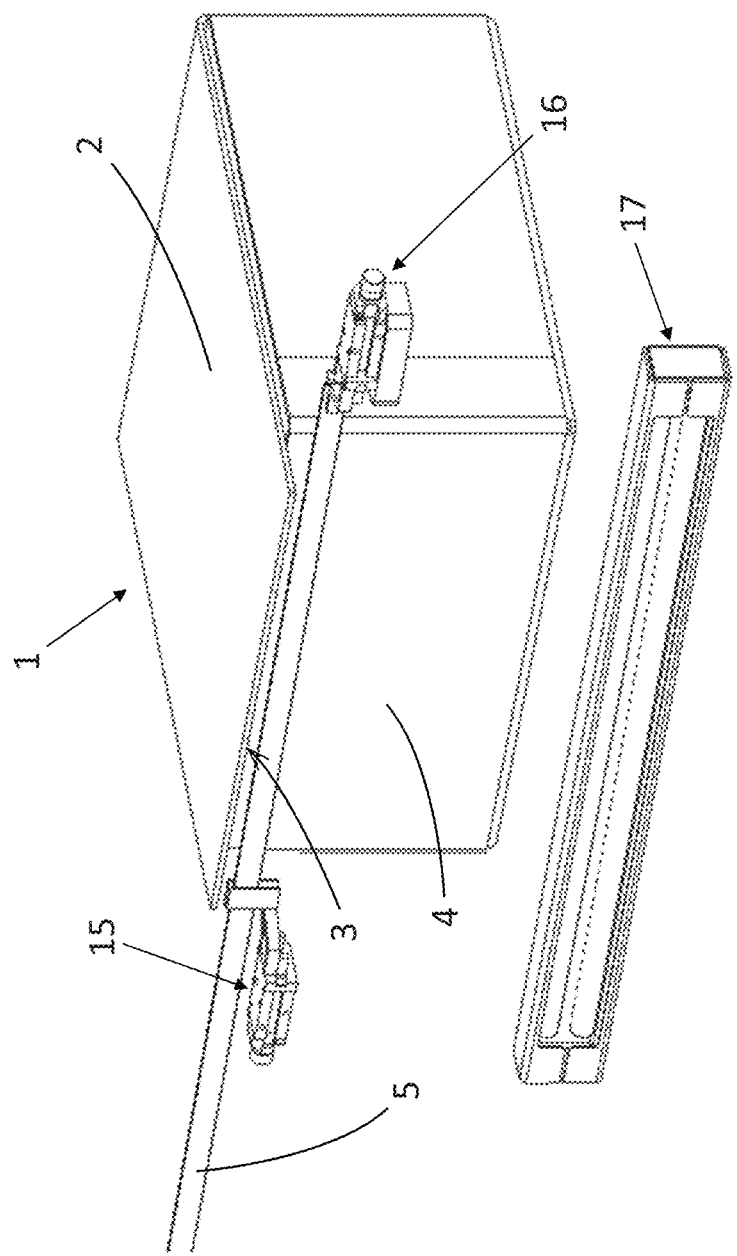

In FIG. 4E the first tape retainer 15 and the second tape retainer 16 continue to translate the tape 5 into a position on the exterior surface of the panel 4 at a location wherein the overlapping flap 3 will eventually contact the exterior surface of the panel 4.

Figure 4F:
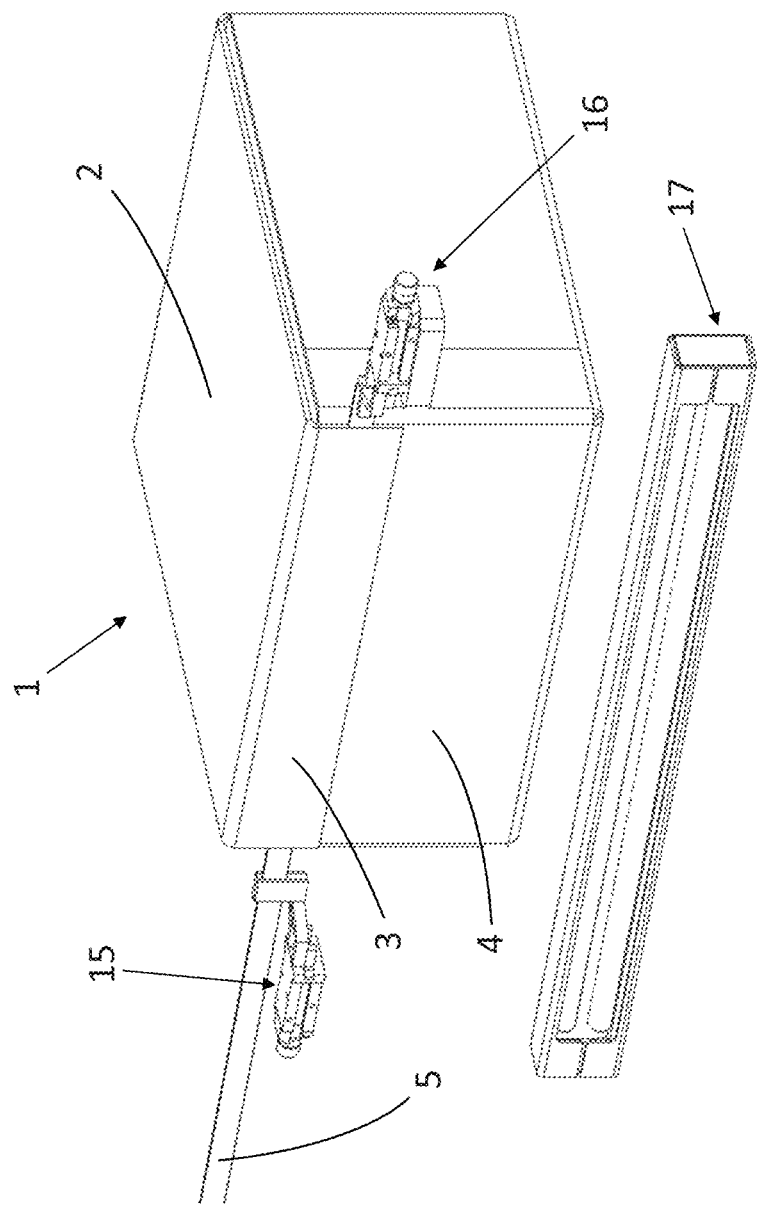

In FIG. 4F the flap 3 is bent and closed over the panel 4 and held by pressure until the adhesive composition on the tape sets to bond the flap 3 and the exterior surface of the panel 4 together. The first tape retainer 15 closes thus retaining the tape and the second tape retainer 16 is opened. The tape 5 is cut adjacent to first retainer 15.

Figure 4G:
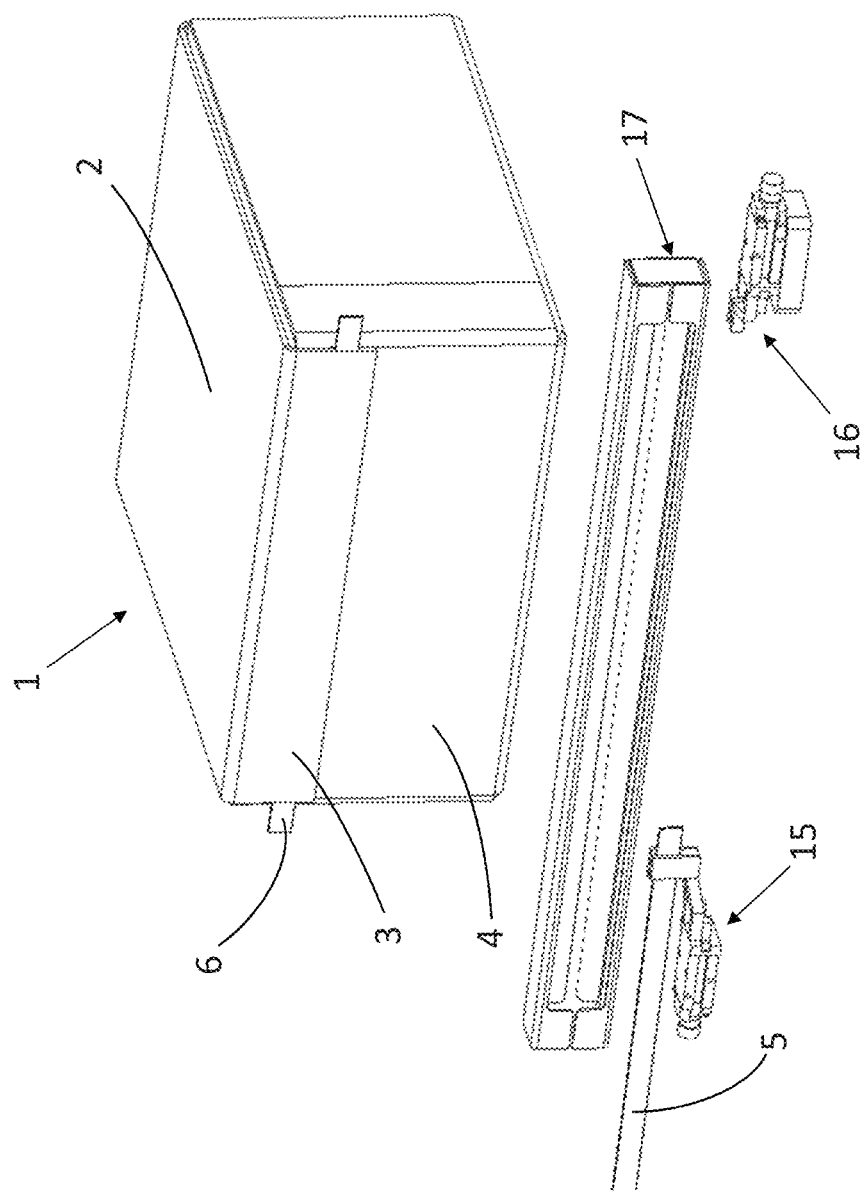

In FIG. 4G the first tape retainer 15 and the second tape retainer 16 retract to the start position shown in FIG. 4A.

Figure 7B:
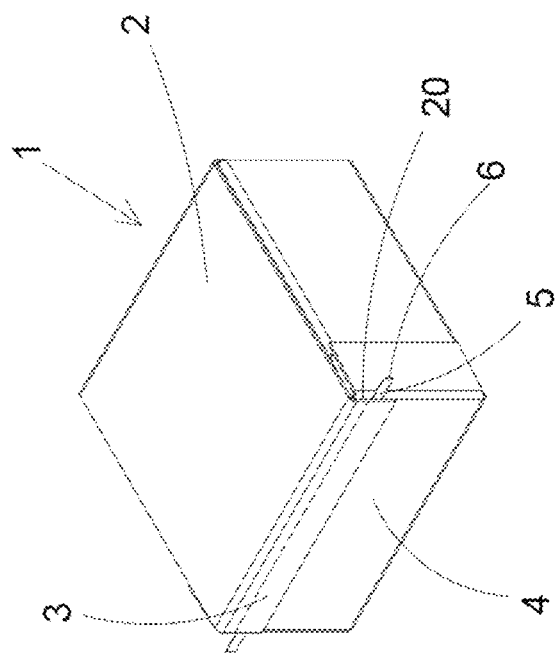
FIGS. 7A and 7B are perspective views of an embodiment that includes a second tape for re-closing the container after the container is opened.
Figure 7A:
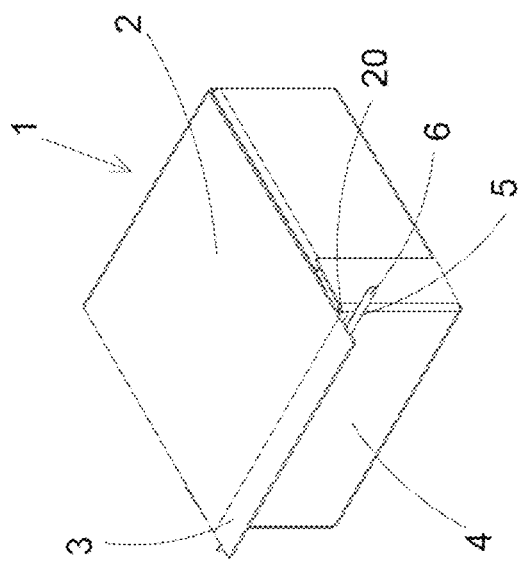
Figure 8A:
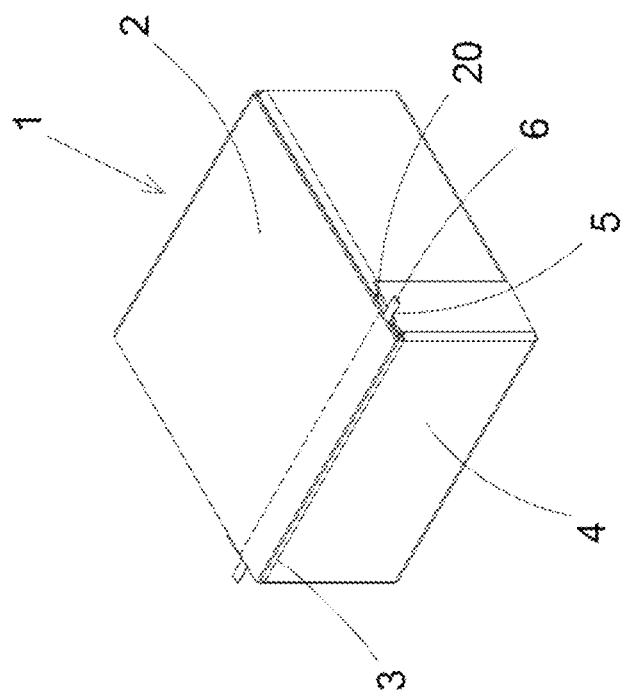
FIGS. 8A and 8B are perspective views of another embodiment that includes a second tape for re-closing the container after the container is opened.
Figure 8B:
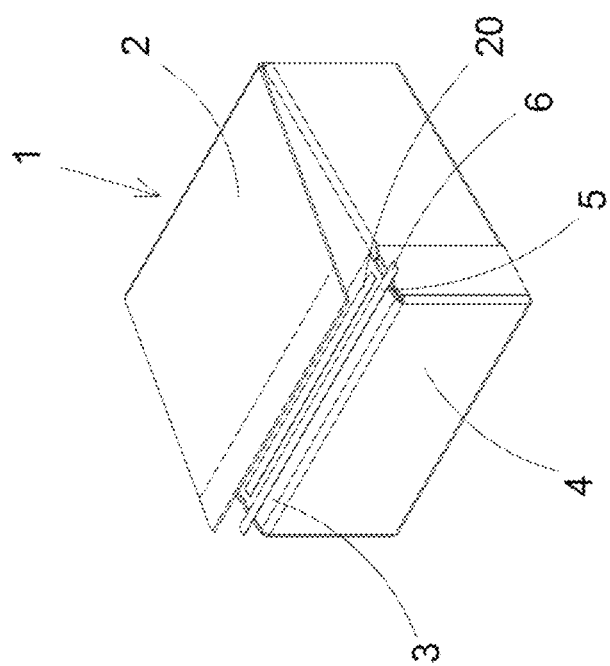

In certain embodiments, a second tape in addition to the activatable tape may be provided to re-close the container after the container has been initially opened. FIGS. 7A and 7B, and 8A and 8B, depict illustrative embodiments of the location of the second tape 20. In FIGS. 7A and 7B the tape 20 is positioned between the side panel 4 and the opening/closing flap 3. The tape 20 is also positioned between (i.e., above) the activatable tape 5 and the opening/closing flap 3 so that tape 20 resides between the side panel 4 and a remainder portion of the opening/closing flap 3 if a portion of the opening/closing flap 3 is torn off during opening of the container via the tape 5. As shown in FIGS. 7A and 7B a perforated line may be provided in opening/closing flap 3 to facilitate tearing open the container such that a portion of the opening/closing flap 3 is retained for re-closing with tape 20. In FIGS. 8A and 8B the tape 20 is positioned between the second opening/closing flap 3 and the first opening/closing flap 2. The tape 20 is also position inward (i.e., toward the interior volume of the container) relative to the location of tape 5 so that tape 20 resides between the second opening/closing flap 3 and a remainder portion of the first opening/closing flap 2 if a portion of the opening/closing flap 2 is torn off during opening of the container via the tape 5. As shown in FIGS. 8A and 8B a perforated line may be provided in opening/closing flap 3 to facilitate tearing open the container such that a portion of the opening/closing flap 3 is retained for re-closing with tape 20.

The second tape defines a first surface facing the interior portion of the container (i.e., side 4 or second opening/closing flap 3) and an opposing second surface facing the exterior portion of the container (i.e., opening/closing flap 3 or first opening/closing flap 2).

In certain embodiments the second tape includes a pressure sensitive adhesive on at least the second surface of the tape. The container can be re-closed by contacting the opened flap against the pressure sensitive adhesive. The pressure sensitive adhesive surface of the tape may also be provided with a removable release liner that covers the pressure sensitive adhesive until re-closing of the container is desired. In certain embodiments, the second tape is a layer of pressure sensitive adhesive with a release liner on top of the pressure sensitive adhesive (no carrier tape is required in this embodiment.

In certain embodiments the second tape may be adhered to the interior portion of the container (i.e., side 4 or second opening/closing flap 3) via an adhesive provided on the first surface of the second tape. The adhesive may be a pressure sensitive adhesive or a hot melt adhesive. The second tape may be applied at a different time compared to when the activatable tape is applied, or the second tape may be applied simultaneously with the activatable tape.

Figure 9:
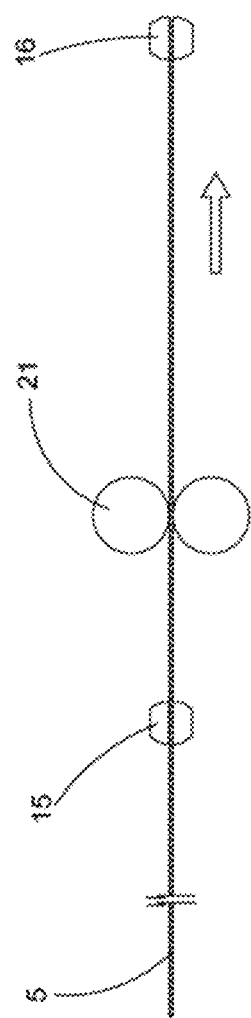
FIG. 9 is a schematic view of an embodiment that includes moisture activation source.

FIG. 9 depicts an illustrative moisture source for activating tape 5. Tape 5 is transported from, or held by, first retainer 15 to second retainer 16. The tape 5 between the first retainer 15 and the second retainer 16 contacts at least one wetted roller 21 (e.g., at a nip between two wetted rollers 21) or a wetted brush. The moisture-activated tape can then be applied to the container.

Figure 10:
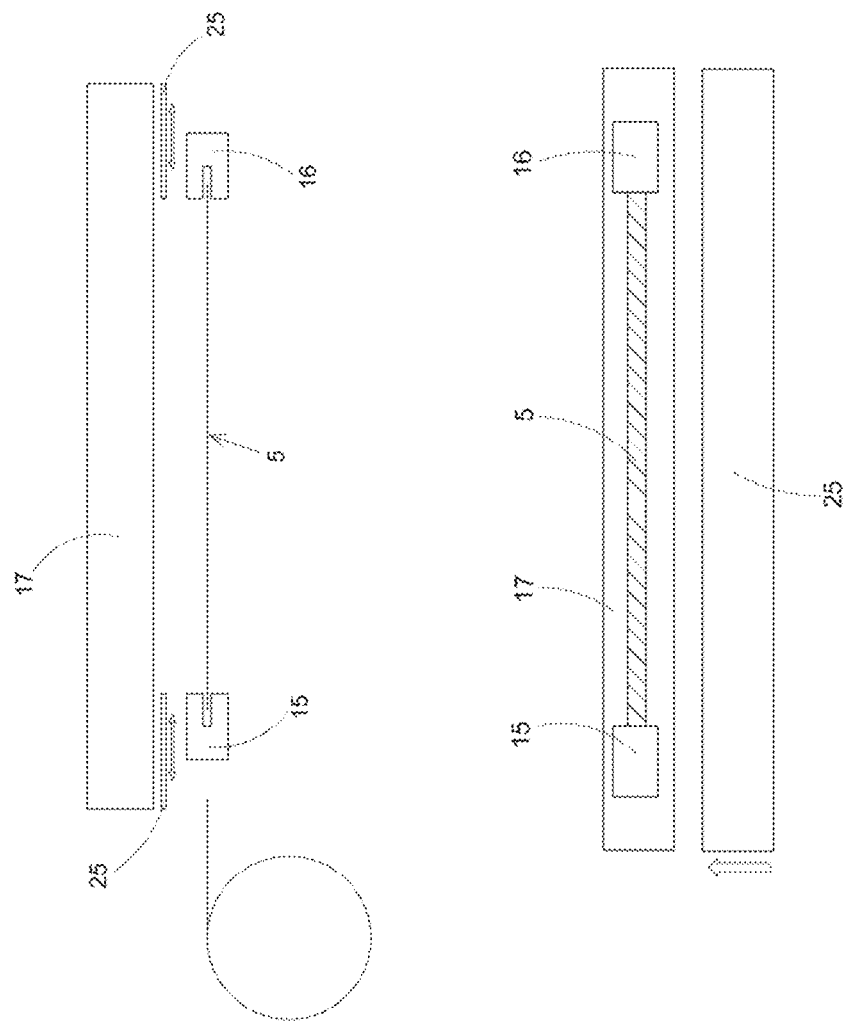
FIGS. 10A and 10B are cross sectional view of embodiments that include a shutter that can be interposed between the activation source and the tape and/or tape retainers, in accordance with some embodiments.

FIGS. 10A and 10B depict embodiments that include a shutter(s) 25 that can be interposed between the heat activator 17 and at least one of the tape 5 (or at least a portion of the tape 5), the first tape retainer 15, and the second tape retainer 16. Interposing the shutter(s) 25 between the heat activator and the tape 5 prevents premature tape activation. Interposing the shutter(s) 25 between at least one of the first tape retainer 15 and the second tape retainer 16 prevents premature activation of the tape 5 as the tape 5 traverses the retainers 15, 16. In FIG. 10A each of the shutters 25 are movable in the direction shown by the arrows for positioning as desired between the heat activator 17 and the retainers 15, 16. In FIG. 10B the shutter 25 is movable in the direction shown by the arrows for positioning in front of the heat activator 17 when on standby and for moving away from the heat activator 17 when tape activation is desired.

Figure 11:
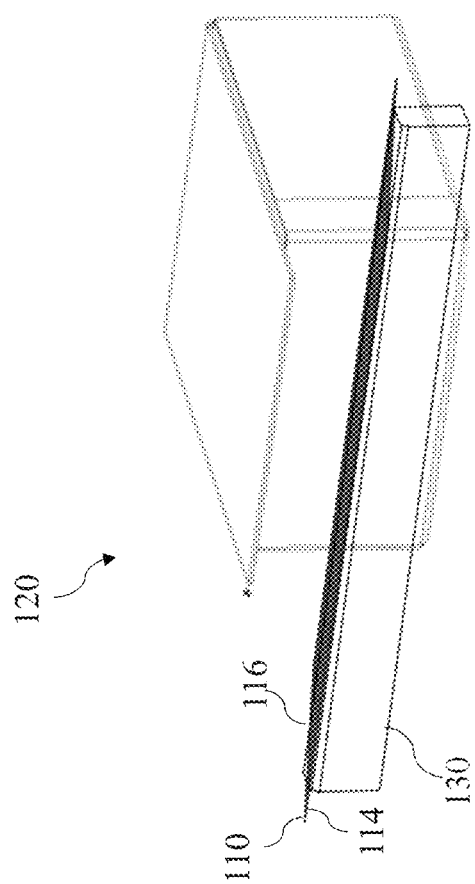
FIG. 11 is a schematic view of a system for applying an adhesive tape, in accordance with some embodiments.

Also disclosed is a process for adhering an adhesive tape 110 to an article 120 using a placement device 130, as shown in FIG. 11. The process includes contacting a first adhesive composition 114 disposed on a first surface of the adhesive tape 110 with the placement device 130 to adhere the tape 110 to the placement device 130 through the first adhesive composition 114, and picking up the adhesive tape 110. The process includes positioning the adhesive tape 110 in relation to a surface of the article 120, contacting the surface of the article 120 with a second adhesive composition 116 disposed on a second surface of the adhesive tape 110 such that the adhesive tape 110 adheres to the surface of the article 120 through the second adhesive composition 116, and separating the placement device 130 from the adhesive tape 110, such that the adhesive tape 110 remains adhered to the surface of the article 120. The placement device 130 is able to pick up the adhesive tape 110 and maintain control of the adhesive tape 110 during movement of the placement device 130 as a result of adhesion between the adhesive tape 110 and the placement device 130. Likewise, the adhesive tape 110 remains adhered to the article 120 as a result of adhesion between the adhesive tape 110 and the article 120.

Figure 12:
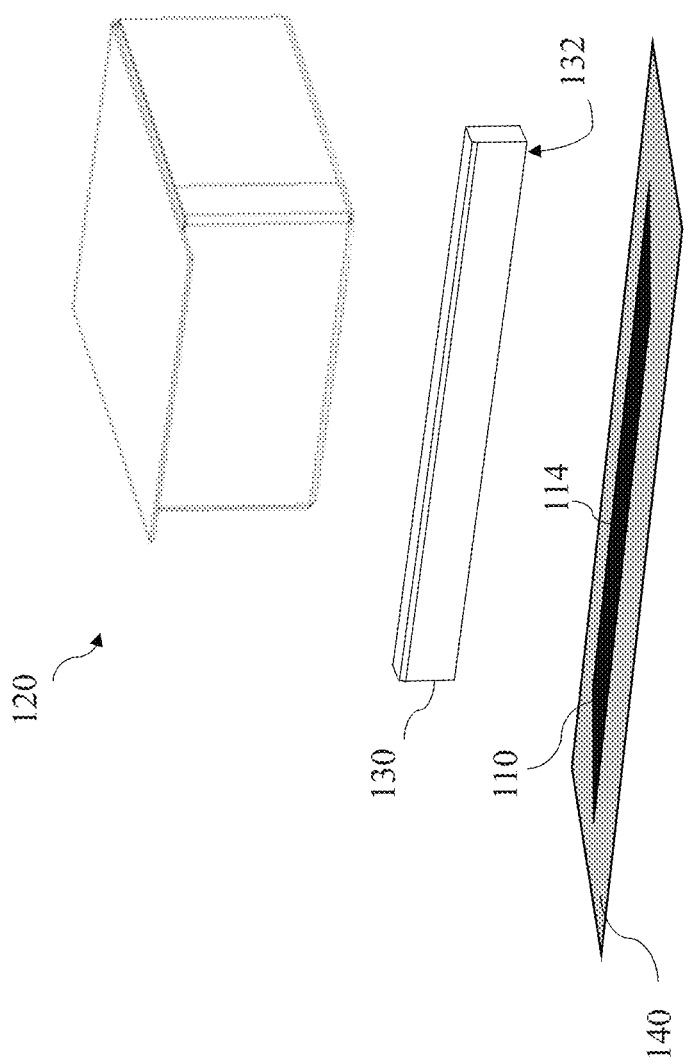
FIG. 12 illustrates a process for applying an adhesive tape, in accordance with some embodiments.

FIGS. 12 to 17 show steps that can be included in the process for applying the adhesive tape 110 to an article 120. As shown in FIG. 12, the placement device 130 is positioned proximate the adhesive tape 110, which is disposed on a delivery system 140 (e.g. a shuttle, a belt, or a release surface). The placement device 130 can be moved to a first position in which a first surface 132 of the placement device 130 contacts the adhesive tape 110 (e.g. the first adhesive composition 114 of the adhesive tape).

Figure 13:
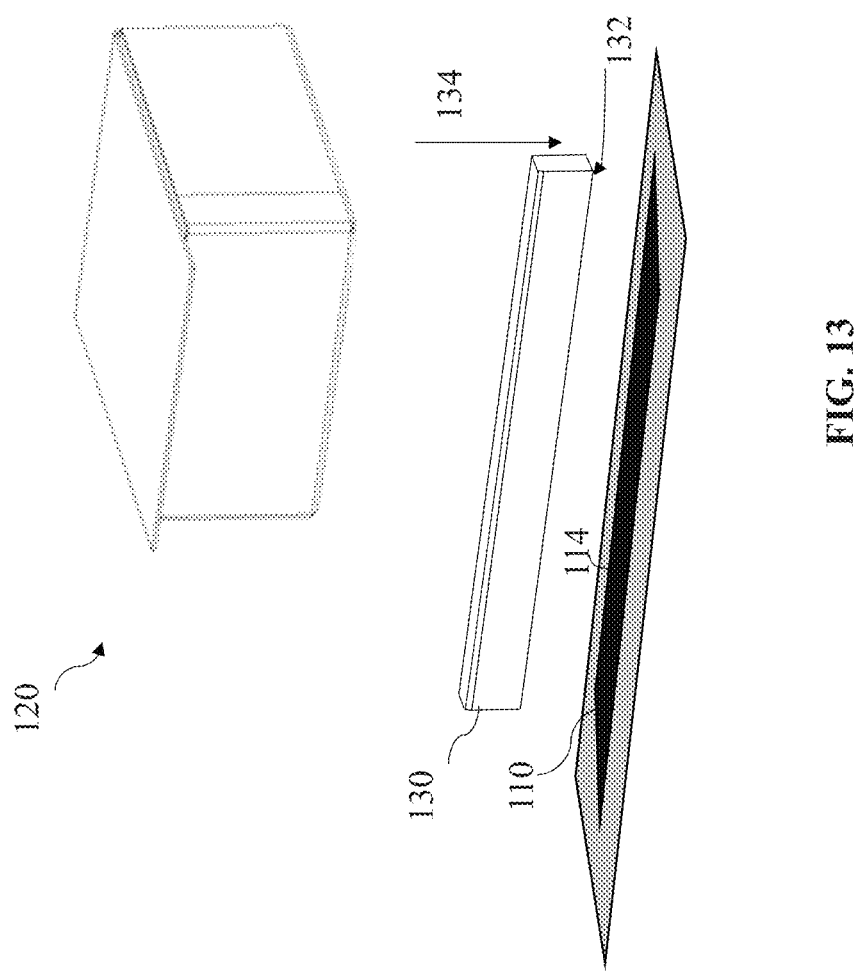
FIG. 13 illustrates a process for applying an adhesive tape, in accordance with some embodiments.

The placement device 130 moves toward the adhesive tape 110 (e.g. in the direction shown by the arrow 134), as shown in FIG. 13. Contacting the first adhesive composition 114 with the first surface 132 of the placement device 130 causes the adhesive tape 110 to adhere to the placement device 130 through the first adhesive composition 114. The first adhesive composition 114 is sufficiently tacky such that the strength of the adhesive bond between the adhesive tape 110 and the placement device 130 is greater than the strength of the bond between the adhesive tape 110 and the delivery system 140 and is sufficient to enable the placement device 130 to separate the adhesive tape 110 from the delivery system 140.

Figure 14:
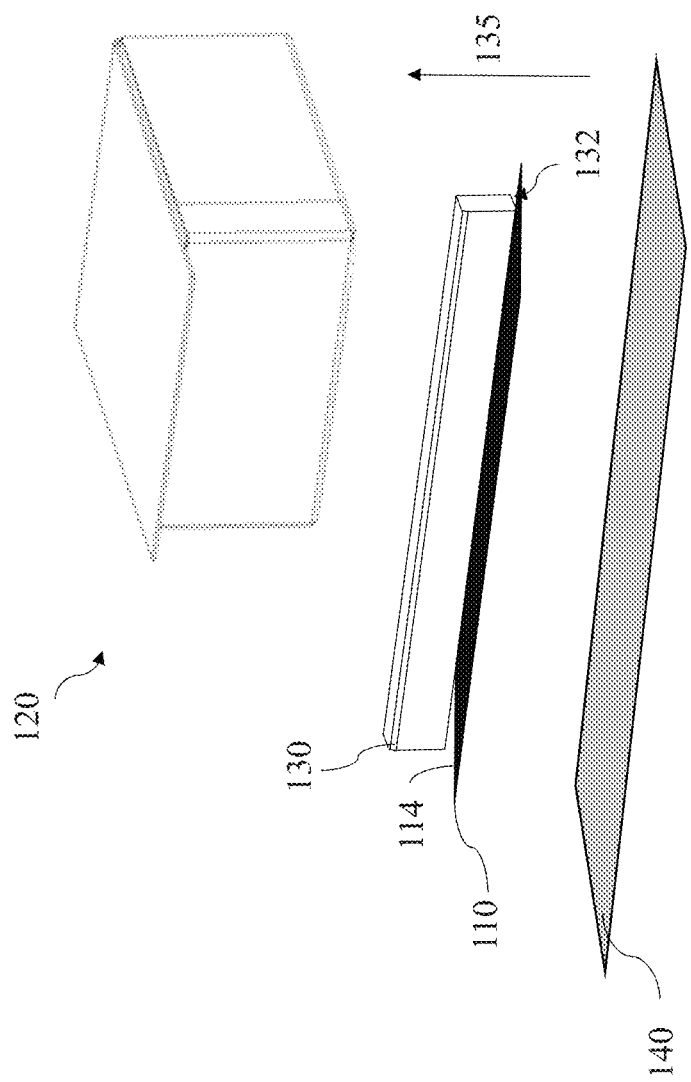
FIG. 14 illustrates a process for applying an adhesive tape, in accordance with some embodiments.

After picking up the adhesive tape 110, the placement device 130 and the adhered adhesive tape 110 move from the delivery system 140 (e.g. in the direction shown by the arrow 135), as shown in FIG. 14. The strength of the adhesive bond between the first adhesive composition 114 and the placement device 130 maintains the adhesive tape 110 in position on the placement device 130 while the placement device 130 is in motion, such as when it moves from the delivery system 140.

Figure 15:
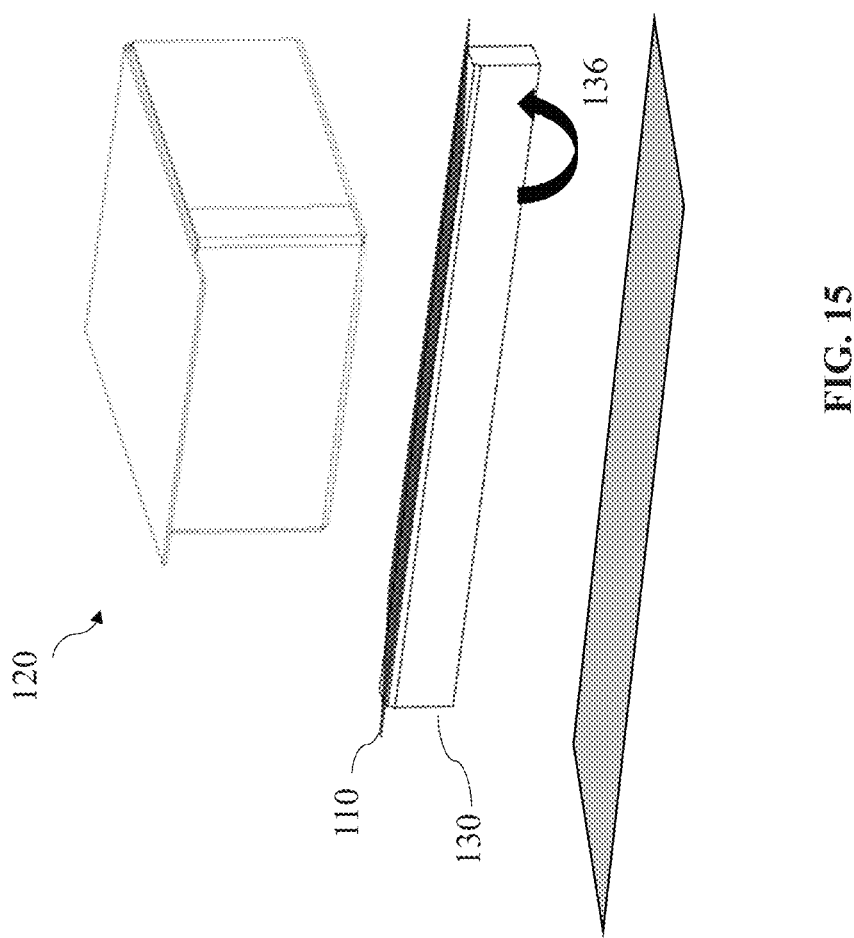
FIG. 15 illustrates a process for applying an adhesive tape, in accordance with some embodiments.

As shown in FIG. 15, the placement device 130 can move relative to the article 120, with the adhesive tape 110 adhered to the placement device 130. For example, if the adhesive tape 110 is positioned on the opposite side of the placement device 130 from the article 120, the placement device 130 can rotate (e.g. in the direction shown by the arrow 136). During the rotation, the adhesive tape 110 remains adhered to the placement device 130. The adhesive bond between the adhesive tape 110 and the placement device 130 can be the only feature that controls the position of the adhesive tape 110 relative to the placement device 130. For example, the placement device 130 can move relative to the article 120 to position the tape 110 in a suitable location in relation to the article 120 without the presence of another device for maintaining the adhesive tape 110 in position on the placement device 130. Such other devices include, for example, a clamping device, gripping device, or dispensing roller, or other device to maintain the position of the tape 110 in relation to the placement device 130. Alternatively or in addition, the placement device 130 can include an additional device for assisting in maintaining the tape in position on the placement device 130 including, for example, a clamping device, gripping device, dispensing roller, and combinations thereof.

Figure 16:
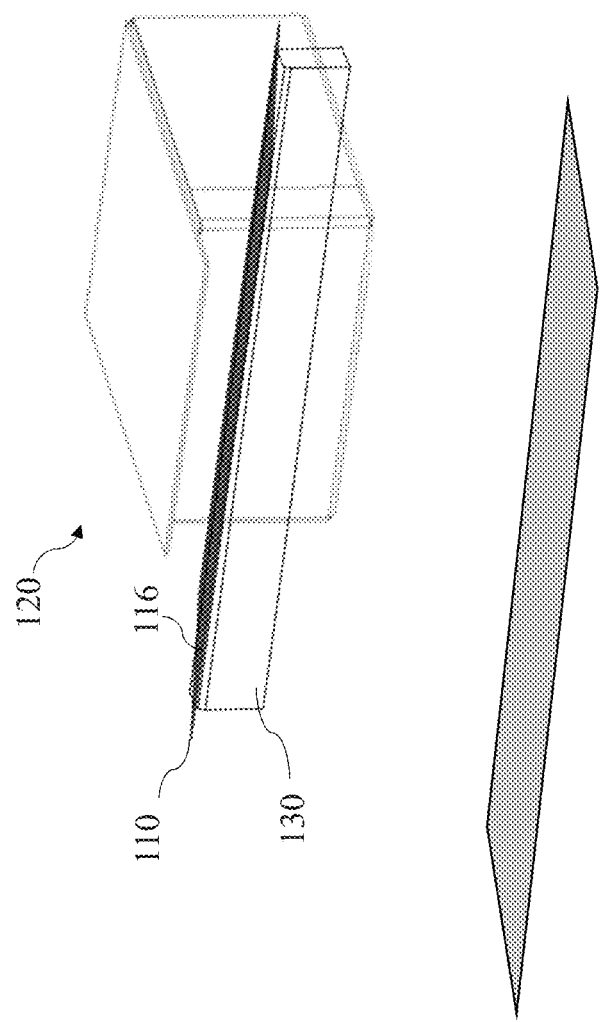
FIG. 16 illustrates a process for applying an adhesive tape, in accordance with some embodiments.
Figure 17:
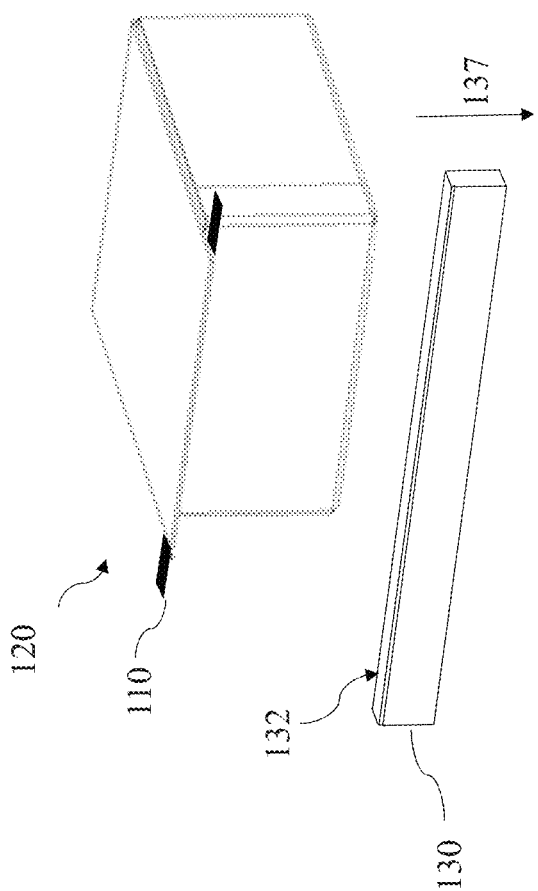
FIG. 17 illustrates a process for applying an adhesive tape, in accordance with some embodiments.

As shown in FIG. 16, the placement device 130 positions the adhesive tape 110 relative to a desired location on the article 120. The placement device 130 can move the adhesive tape 110 toward the article 120 such that the second adhesive composition 116 contacts the article 120. In some embodiments, the placement device 130 remains stationary and the article 120 can move towards the adhesive tape 110 on the placement device 130 such that the second adhesive composition 116 contacts the article 120. The placement device 130 exerts a sufficient force against the adhesive tape 110 and article 120 such that the adhesive tape 110 adheres to the article 120 through the second adhesive composition 116. The strength of the adhesive bond formed between the second adhesive composition 116 and the article 120 is greater than the strength of the adhesive bond formed between the adhesive tape 110 and the placement device 130 such that when the placement device 130 moves from the article 120 (e.g., in the direction of the arrow 137) the placement device 130 separates from the adhesive tape 110, as shown in FIG. 17. Additional steps may be carried out on the article 120 after the adhesive tape 110 is attached to the article 120.

The placement device 130 can be used to apply adhesive tape to a variety of articles including, e.g., a container (e.g., a box, a carton, a tube, a crate), a bag (e.g., an envelope, a sack, a lunch bag, a coffee bag, a garment bag, and a bubble wrap bag), and combinations thereof. The placement device 130 also can be used to apply adhesive tape in a variety of locations on the article. FIGS. 18A to 18D show some examples of some of the articles.

Figure 18A:
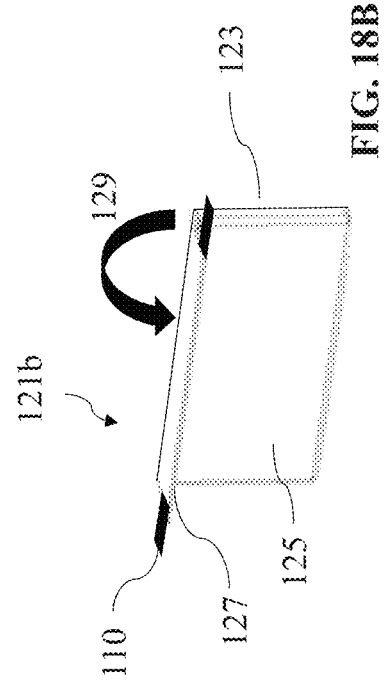
FIGS. 18A to 18D are schematic views of various processes for closing a container, in accordance with some embodiments.

As shown in FIG. 18A, the article is in the form of a container 121 that includes a first panel 122, a second panel 124, and a flap 126. The flap 126 is contiguous with the first panel 122. The flap 126 may be a closing flap (e.g. the container 121 can be closed by joining the flap 126 to another component of the container 121 to close off the internal volume of the container 121 from the outside of the container 121). The adhesive tape 110 can be positioned on any suitable location on the container 121. For example, the adhesive tape 110 can be positioned on the container 121 such that the adhesive tape 110 is suitable for reinforcing the container 121 or for placing a label. As shown, the adhesive tape 110 can be positioned on the flap 126, including, e.g., on the inside surface of the flap 126, as shown in FIG. 18A. Alternatively or in addition, the adhesive tape 110 can be positioned on the second panel 124. The flap 126 can be folded (e.g. in the direction of the arrow 128) and the adhesive tape 110 can contact the second panel 124 such that the second panel 124 is bonded to the flap 126 through the adhesive tape 110. In some instances, the flap 126 can be pressed against the second panel 124 to bring the adhesive tape in contact with the second panel 124.

In some instances, the adhesive tape is positioned on a container such that the adhesive tape is suitable for use in both closing and subsequently opening the container. As an example, such a tape can be used to bond a first component (such as a flap) of a container to a second component (such as a panel or a second flap) of the container to assist in closing the container, and can subsequently be used to open the container, for example, by pulling the tape such that it releases from or tears through at least one of the first component and second component of the container. In some instances, such as if the container is formed from material that can be torn, the adhesive tape can be positioned on an inward facing surface of a component (such as a panel or a flap) of the container such that the adhesive tape can be pulled to tear through at least one of the panel and flap and form an opening to the inside of the container.

In some embodiments, the adhesive tape can be positioned along the surface of the article such that at least a portion of the length of the adhesive tape is not in direct contact with the article. For example, a portion of the length of the adhesive tape 110 can extend from the surface of the container 121, as shown in FIG. 18A. The portion of the adhesive tape that is not in direct contact with the article can form a tab. In some embodiments, the adhesive tape can be positioned to form a tab that can be pulled to tear through a portion of the article. For example, if the article is a container, the tab can be used to hold the adhesive tape while pulling the adhesive tape to tear through the container and form an opening to the inside of the container.

In some embodiments, the entire length of the adhesive tape can be adhered to the article. For example, the adhesive tape can be positioned such that the ends of the adhesive tape are flush with the article. As a further example, the adhesive tape can be positioned on the container such that after the flap is bonded to the second panel through the adhesive tape, the entire length of the adhesive tape is positioned between the flap and the second panel. In some embodiments, at least one of the flap and the second panel can have a tab positioned proximate to where the adhesive tape is positioned on the article such that after the flap is bonded to the second panel a user can tear a portion of the flap or the second panel at the tab to access the adhesive tape and then pull the adhesive tape which tears through the flap or the second panel to open the article.

Figure 18B:
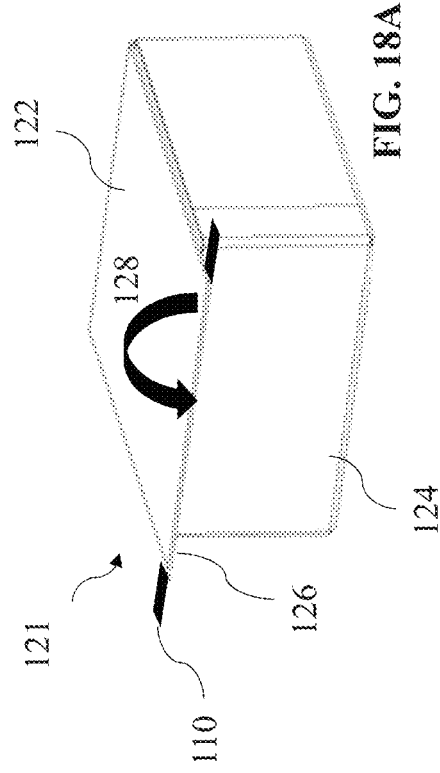

In another example, an article can be a container in the form of a bag 121*b*, as shown in FIG. 18B. The bag 121*b* includes a first panel 123, a second panel 125, and a flap 127. The first panel 123 can be joined to the second panel 125 along a portion of a periphery of the first panel 123 and the second panel 125. For example, the first panel 123 can be joined to the second panel 125 along three sides of the periphery of the first panel 123 and the second panel 125. The remaining fourth side of the first panel 123 and the second panel 125 can define an opening to the inside of the bag 121*b*. The first panel 123 can be contiguous with the flap 127. With the process disclosed herein, the adhesive tape 110 can be attached to any suitable location on the bag 121*b*. As shown, the adhesive tape 110 is positioned on the flap 127. Additionally or alternatively, the adhesive tape 110 can be positioned on the second panel 125. The flap 127 can be folded (e.g. in the direction of the arrow 129) and the adhesive tape 110 can contact the second panel 125 such that the second panel 125 is bonded to the flap 127 through the adhesive tape 110. In some instances, the adhesive tape 110 can be applied to a location on the bag 121*b* such that the adhesive tape 110 is suitable for opening the bag 121*b*, such as by pulling the adhesive tape 110 to tear through the flap 127 and form an opening to the inside of the bag 121*b*.

Figure 18C:
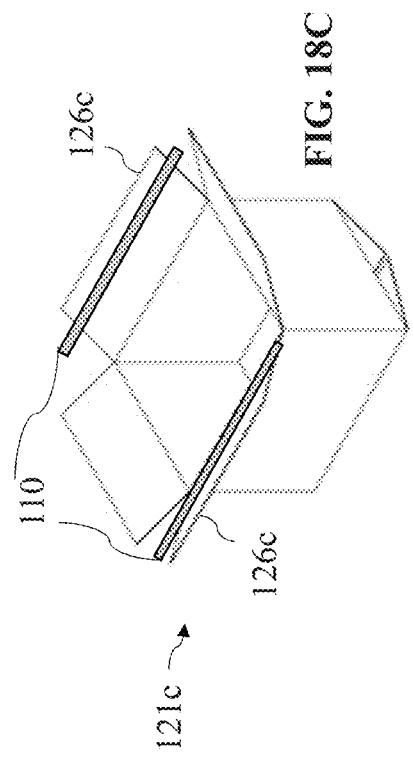

The process disclosed herein can be used to place adhesive tape on any desired location on an article, including multiple locations on an article. For example, for a container 121*c* having at least two flaps 126*c* forming a cover for an opening in a container 121*c*, such as a box formed as a regular slotted container as shown in FIG. 18C, adhesive tape 110 can be placed on the two or more flaps 126*c*. For instance, two or more pieces of adhesive tape 110 can be placed on any position on the flaps, such as an inward facing surface of the flaps 126*c* as shown, such that the adhesive tape 110 is used to hold the flaps 126*c* closed. The adhesive tape 110 can also be used to open the container 121*c*, such as by pulling the adhesive tape 110 such that it tears through at least one of the flaps 126*c*.

Figure 18D:
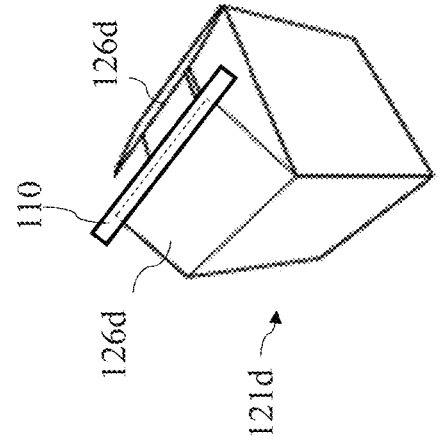

In some instances the adhesive tape 110 can be placed on the outer facing surface of a container 121*d*, such as on the outside of flaps 126*d*, as shown in FIG. 18D. For example, the adhesive tape 110 can be positioned along a seam formed where the edges of two or more flaps 126*d* meet. The adhesive tape 110 can be placed such that the two or more flaps 126*d* are held together by the adhesive tape 110 such that the opening to the container 121*d* is closed. The adhesive tape 110 can be applied on both of the flaps 126*d* such that the adhesive composition on a first surface of the adhesive tape contacts a first surface of the container 121*d* (on a first flap) and a second surface of the container 121*d* (on a second flap) and the flaps 126*d* are held together by the adhesive tape to close the container 121*d*.

The process can also be used to attach various items to an article. For example, the adhesive tape can be placed on a surface of the article such that additional components may be attached to the article through the adhesive tape. For example, a first side of the adhesive tape may be attached to the article and an additional component such as a label may be contacted with the second side of the adhesive tape such that the additional component is attached to the second side of the adhesive tape and remains attached to the article through the adhesive tape. In some embodiments, the adhesive tape may be a label. In another example, the process includes applying the adhesive tape over a portion of a component to be attached to the article. For example, if the component to be attached is a handle, the adhesive tape can be applied over end portions of the handle, such that the handle is attached to the article.

The process optionally includes activating the adhesive composition including, e.g., activating the first adhesive composition, activating the second adhesive composition, and combinations thereof. The activating can occur before contacting the adhesive tape with the placement device, during the step of contacting the adhesive tape with the placement device, after contacting the adhesive tape with the placement device, and in various combinations thereof. The process can include activating the entire first adhesive composition, activating a portion of the first adhesive composition of such that a remaining portion of the first activatable adhesive composition is not activated, activating the entire second adhesive composition, activating a portion of the second adhesive composition, such that a remaining portion of the second adhesive composition is not activated, and combinations thereof. The portion of the adhesive composition that is activated can be a portion of a length, a depth, a width, and combinations thereof.

The adhesive tape may be in the form of any suitable configuration that has at least one adhesive composition defining a first and second surface. The adhesive tape can be of a variety of configurations including a double-sided configuration, e.g. an adhesive on two sides of the tape, or a multilayer adhesive tape construction that includes multiple layers of adhesive composition disposed on a carrier substrate. Further useful examples, include adhesive tapes that include printing to form a label, or are shaped such as to form a patch or a gasket, and combinations thereof. In some embodiments, the adhesive tape can be configured as a closing and opening tape.

The adhesive tape can include any suitable adhesive composition. Useful classes of adhesive compositions include, for example, a pressure sensitive adhesive composition, a hot melt pressure sensitive adhesive composition, an activatable adhesive composition that becomes tacky when activated (e.g., a reactive adhesive composition, a heat activated adhesive composition, a radiation activated adhesive composition, moisture activated adhesive compositions, and combinations thereof), and combinations thereof. Useful activatable adhesive compositions become tacky when activated by an activation source including, e.g., ultraviolet light radiation, electron beam radiation, infrared radiation, thermal radiation (e.g., heat, hot air, direct contact with a heated surface, and combinations thereof), chemical additives (e.g., adding a chemical to the composition), moisture, oxygen, and combinations thereof.

Figures 19A, 19B:
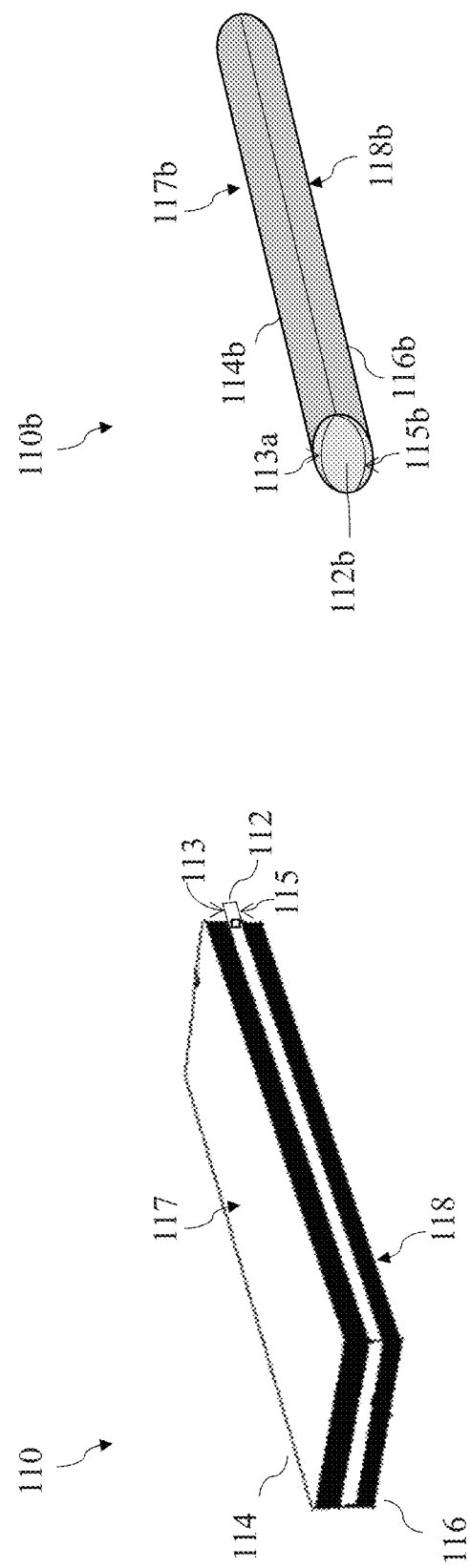
FIG. 19A is a schematic view of an adhesive tape, in accordance with some embodiments.
FIG. 19B is a schematic view of an adhesive tape, in accordance with some embodiments.

In one embodiment, the adhesive tape 110 includes a carrier substrate 112 that includes a first surface 113*a* and a second surface 115*a* opposite the first surface 113*a*, a first adhesive composition 114 disposed on the first surface 113 of the carrier substrate 112, and a second adhesive composition 116 disposed on a second surface 115 of the carrier substrate 112, as shown in FIG. 19A. The first adhesive composition 114 defines a first surface 117 of the adhesive tape 110. The second adhesive composition 116 defines a second surface 118 of the adhesive tape 110. As shown in FIG. 19A, the adhesive tape 110 can have a relatively planar shape.

In another embodiment, an adhesive tape 110b exhibits a generally cylindrical shape having a length and a curved, circular, or oval cross section, as shown in FIG. 19B. The adhesive tape 110b can be shaped as a string. The adhesive tape 110b includes a carrier substrate 112b having a curved cross section, a first adhesive composition 114b disposed on a first surface 113a of the carrier substrate 112b, and a second adhesive composition 116b disposed on a second surface 115b of the carrier substrate 112b. The first adhesive composition 114b defines a first surface 117b of the adhesive tape 110b, and the second adhesive composition 116b defines a second surface 118 of the adhesive tape 110b.

In configurations in which the adhesive tape includes more than one adhesive composition, the adhesive compositions can be the same or different and can be of any suitable composition. In one embodiment, the adhesive tape includes a first activatable adhesive composition and a second activatable adhesive composition. In another embodiment, the adhesive tape includes a first activatable adhesive composition and a second pressure sensitive adhesive composition.

The adhesive tape can have any suitable length including e.g. from about 25 mm, about 55 mm, about 100 mm, to about 400 mm, about 500 mm, or about 600 mm, or even greater than one meter. The tape can include a carrier substrate having any desired thickness including, e.g., a thickness from about 0.5 mil (13 µm), about 1 mil (25 µm), or about 1.5 mil (38 µm), to about 2 mil (51 µm), about 2.5 mil (64 µm), about 3 mil (76 µm), or about 10 mil (254 µm), or a thickness between any pair of the foregoing values. Suitable tapes include tapes that include a carrier substrate having at least one of paper, metal, a polymeric material such as a plastic, a thermoplastic material, including nylon, PP (polypropylene), PE (polyethylene), PC (polycarbonate), polyethylene terephthalate (PET), metallized PET, metallized PP, and combinations thereof. Suitable tapes includes commercially available tapes that include a carrier substrate formed from metallized PET, such as that sold under the trade name MYLAR (available from Dow DuPont, located in Midland, Mich.).

Each layer of adhesive composition disposed on the adhesive tape can have any desired thickness including, e.g., a thickness from about 0.5 mil (13 µm), about 1 mil (25 µm), or about 1.5 mil (38 µm), to about 2 mil (51 µm), about 2.5 mil (64 µm), about 3 mil (76 µm), or about 10 mil (254 µm), or a thickness between any pair of the foregoing values. Each layer of adhesive on the tape can be of the same or different thickness.

The adhesive composition preferably forms a bond with a substrate after the adhesive composition is in contact with the substrate for a period of time including, e.g. about 80 milliseconds, about 100 milliseconds, about 150 milliseconds, or about 200 milliseconds, to about 300 milliseconds, 400 milliseconds, about 500 milliseconds, about 1 second, about 5 seconds, or about 10 seconds, or a duration between any pair of the foregoing values.

Suitable commercially available adhesive tapes include those available under the tradename SESAME (from H.B. Fuller Company, located in St. Paul, Minn.).

FIG. 20 is a schematic view of a system 150 for applying adhesive tape 110 to an article 120 with the process disclosed herein. The system 150 includes the placement device 130, an optional tape delivery system 140, an optional first activation source 160, and an optional second activation source 162.

As shown, the optional delivery system 140 can deliver the adhesive tape 110 to a position near the placement device 130. The delivery system 140 can be any suitable device for delivering the adhesive tape 110 from a tape source (not shown) to a position near the placement device 130 including, e.g., a shuttle, or a conveyer belt. The delivery system 140 can include a release surface for releasing the adhesive tape 110 from the delivery system 140. The delivery system can include a release liner, such as for optionally forming a backing for the adhesive tape 110. The release surface can enable the adhesive tape 110 to be easily picked up by the placement device 130 without remaining adhered to the tape delivery system 140. Further embodiments of the delivery system 140 are described below.

The first optional activation source 160 can be any source capable of activating an adhesive composition of the adhesive tape 110. The first activation source 160 can be configured to activate an adhesive composition of the tape 110 as the adhesive tape 110 is being moved from a tape source (not shown) to a position proximate to the placement device 130. For example, the first activation source 160 can be configured to activate an adhesive composition that defines a first surface of the adhesive tape 110 before the placement device 130 contacts the first surface of the adhesive tape 110. The first activation source 160 can be configured to deliver at least one of ultraviolet light radiation, electron beam radiation, infrared radiation, thermal radiation, hot air, direct contact with a heated surface, chemical additives, and moisture to an adhesive composition. For example, the first activation source 160 can be configured to provide moisture by spraying or misting a liquid toward the adhesive composition of the adhesive tape 110. The first activation source 160 can be configured to activate a portion of a length of an adhesive composition of the adhesive tape 110, such that a remaining portion of the length of the adhesive composition is not activated.

The second optional activation source 162 can be suitable for activating an adhesive composition of the adhesive tape 110. The second activation source 162 can be positioned along a path that the placement device 130 passes between the delivery system 140 and the article 120. The second activation source 162 can be configured to activate an adhesive composition of the adhesive tape 110 as the adhesive tape 110 is being moved from the delivery system to a position proximate the article 120. For example, the second activation source 162 can be configured to activate an adhesive composition that defines a second surface of the adhesive tape 110 before the adhesive composition contacts the article 120. The second activation source 162 can be configured to deliver at least one of ultraviolet light radiation, electron beam radiation, infrared radiation, thermal radiation, hot air, direct contact with a heated surface, chemical additives, and moisture to an adhesive composition. For example, the second activation source 162 can be configured to provide moisture by spraying or misting a liquid toward the adhesive composition of the adhesive tape 110. Certain compositions that may be applied as a mist or a liquid include nonpolar solvents, polar solvents such as alcohols or water, surfactants, and combinations thereof. The second activation source 162 can be configured to activate a portion of a length of an adhesive composition of the adhesive tape 110, such that a remaining portion of the length of the adhesive composition is not activated.

In some embodiments, at least one of the first or second activation source 160, 162 can be used to activate the entire length of an adhesive composition of the adhesive tape 110. It is envisioned that any portion of the adhesive tape 110 that does not contact the article after the adhesive tape 110 has been applied can return to a non-activated state and become non-tacky. For example, the adhesive tape 110 can include a hot-melt adhesive composition that becomes activated when heated, such as to a temperature above room temperature (e.g. from about 22° C. to about 25° C.). At least one of the first or second activation source 160, 162 can be used to activate the hot melt adhesive composition by heating it above room temperature, and the adhesive tape 110 can be applied to the article 120. After the adhesive tape 110 has been applied to the article 120, the hot melt adhesive composition can cool to a temperature below room temperature and solidify. After solidifying, the portion of hot melt adhesive that is in contact with the surface of the article is bonded to the article, and the portion of the hot melt adhesive that is not in contact with the surface of the article can solidify and become non-tacky. The portion of the hot melt adhesive that is not in contact with the surface of the article 120 can form tabs for gripping the adhesive tape 110 as it is drawn and forms an opening to the internal volume of the article 120.

The placement device 130 is configured to pick up the adhesive tape 110 and position the adhesive tape 110 along a surface of the article 120. As shown, the placement device 130 can be positioned proximate to the article 120. The placement device 130 can be positioned proximate to the delivery system 140 such that the placement device 130 can move between the delivery system 140 and the article 120 without the need to travel a long distance. In some embodiments, the system 150 can have more than one placement device 130. In some embodiments, the system 150 includes at least one of the first and second activation source 160, 162 and the placement device 130 does not include an activation source. In some embodiments, the placement device 130 optionally can include an activation source. That is, the system 150 can include at least one of the first and second activation source 160, 162 and the placement device 130 can also include an activation source, such as a heated surface. In some embodiments, the system 150 is free of the first and second activation source 160, 162 and the placement device 130 includes an activation source.

In some embodiments, the placement device 130 can be shaped as a cylinder or drum that can rotate when in operation. For example, the placement device 130 can be shaped as a cylinder having a length defining a central axis and an outer surface located radially from the central axis and defining a diameter. The placement device 130 can be configured to rotate around the central axis such that the outer surface moves between the delivery system 140 and the article 120. In some embodiments, the placement device 130 can be configured to rotate around the central axis such that the outer surface moves between the delivery system 140 to pick up a section of adhesive tape 110 and positions it on the article 120. In some embodiments, the placement device 130 can include an activation source such that as the placement device 130 rotates and picks up the section of adhesive tape 110 and positions it on the article 120 the placement device 130 can also activate an adhesive composition of the adhesive tape 110. In some embodiments, the placement device 130 can be configured as a drum having a heated surface that can pick up a section of adhesive tape 110 and activate an adhesive composition of the tape, and the drum can rotate to position the section of adhesive tape 110 on an article.

Figure 21:
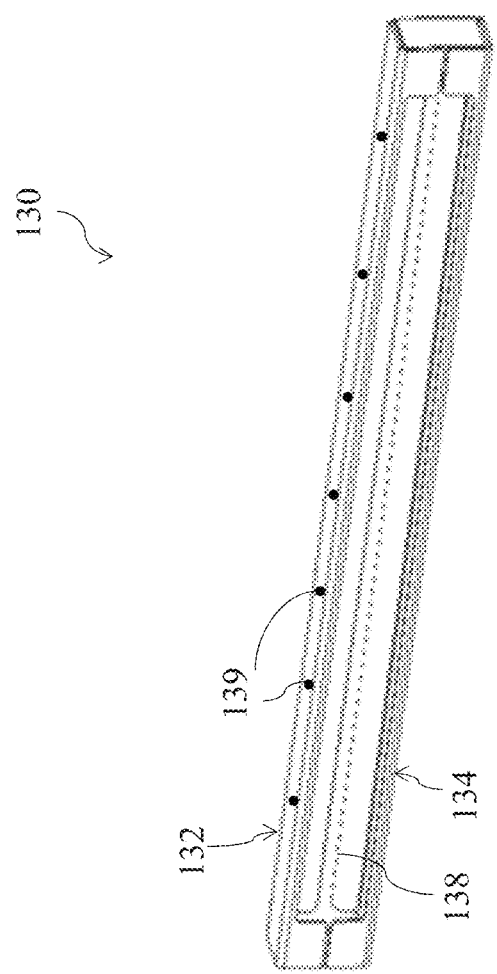
FIG. 21 is schematic view of a placement device for applying an adhesive tape, in accordance with some embodiments.

FIG. 21 is a schematic view of the placement device 130 in accordance with some embodiments, showing the first surface 132 and a second surface 134 of the placement device 130. The placement device 130 is configured to contact an adhesive composition defining a surface of an adhesive tape and pick up the adhesive tape through adhesion of the adhesive composition with at least one of the first surface 132 and the second surface 134. The placement device 130 can be any device suitable to retain the adhesive tape on the placement device 130 by only adhesion of the adhesive composition to at least one of the first surface 132 and the second surface 134. In some embodiments, the placement device 130 can be configured to pick up more than one piece of tape at the same time. For example, the placement device can be configured to pick up more than one length of tape along at least one of the first surface 132 and the second surface 134. The placement device 130 can be configured to pick up a first piece of tape along the first surface 132, and a second piece of tape along the second surface 134. In some examples, the placement device 130 that is configured to pick up more than one piece of tape at the same time provides a system for placing more than one piece of tape on an article for each time the placement device 130 travels from a tape delivery system to the article.

The placement device 130 optionally includes an activation source 138. For example, at least one of the first surface 132 and the second surface 134 of the placement device 130 can be a surface that is heated by the activation source 138 such that at least one of the first surface 132 and the second surface 134 activates a heat activatable adhesive composition. The placement device 130 can be configured to activate an activatable adhesive composition through direct contact with at least one of the first surface 132 and the second surface 134 which causes the tape to adhere to the placement device 130 through the activated adhesive composition. In some embodiments, the placement device 130 can be configured to activate a first activatable adhesive composition defining a first side of a tape and a second adhesive composition defining a second side of a tape. For example, the placement device 130 can be configured to activate a first activatable adhesive composition through direct contact with a heated surface of the placement device 130, pick up the tape, and activate a second activatable adhesive composition by providing thermal energy that transfers through the carrier substrate and activates the second adhesive composition.

In some embodiments, the placement device 130 can include an activation source 138 configured to provide at least one of ultraviolet light radiation, electron beam radiation, infrared radiation, thermal radiation, hot air, direct contact with a heated surface, chemical additives, and moisture to an adhesive composition. For example, at least one of the first surface 132 and the second surface 134 can be a mesh or grid, defining a planar surface having holes defined through the planar surface. The activation source 138 can include an infrared radiation source placed behind the mesh and configured to provide infrared radiation through the mesh and towards an adhesive composition. The placement device 130 can be positioned proximate a tape having an adhesive composition with the infrared radiation source directed toward the adhesive composition. The infrared radiation can activate the adhesive composition and then the placement device can be brought in contact with the adhesive composition.

The placement device 130 can be configured to have at least one of the first surface 132 and the second surface 134 heated to a temperature from about 120° C. (250° F.), about 150° C. (300° F.), about 180° C. (360° F.), or about 210° C. (410° F.), to about 240° C. (460° F.), about 270° C. (520° F.), about 300° C. (570° F.), or about 330° C. (620° F.), or even as great as 520° C. (1000° F.), or a temperature between any pair of the foregoing values. The placement device 130 can be configured to activate an adhesive composition by heating the adhesive composition through direct contact with at least one of the first surface 132 and the second surface 134 to the adhesive composition for about 80 milliseconds, about 100 milliseconds, about 150 milliseconds, or about 200 milliseconds, to about 300 milliseconds, 400 milliseconds, about 500 milliseconds, about 1 second, about 5 seconds, or even 10 seconds, or a duration between any pair of the foregoing values.

In some embodiments, the placement device 130 can be formed from materials including plastics, composite material such as carbon fiber, metals, metal alloys, and combinations thereof. Suitable metals and metal alloys for forming the placement device includes aluminum, iron, chrome, and their alloys, and combinations thereof. In some embodiments, the placement device 130 may be formed from aluminum and include a non-stick surface such as chrome or a chrome alloy along at least one of the first surface 132 and the second surface 134. In some embodiments, the placement device 130 may include a non-stick coating, for example a low surface energy coating such as polytetrafluoroethylene (PTFE), on at least one of the first surface 132 and the second surface 134. In one example, a suitable placement device includes an aluminum frame and hardened chrome along the first surface.

In some embodiments, the placement device 130 may employ features such as a separation system to help separate an adhesive tape from the placement device 130. One separation system includes holes 139 defined though at least one of the first surface 132 and second surface 134 of the placement device 130. The holes 139 can be in fluid communication with a pump (not shown) which provides positive air pressure (i.e. a pressure greater than atmospheric pressure) and provides air flowing through the holes 139. The positive air pressure exerts a force on the tape, which assists in separating the tape from the first surface 132 of the placement device 130. In some instances, a separation system can be employed to apply an adhesive tape to an article without the placement system directly contacting the adhesive tape as the tape is contacting the article. For example, a separation system can be used to blow the adhesive tape toward the article with the placement device spaced apart from the article, such that the adhesive tape is applied to the article after the adhesive tape is separated from the placement device.

In some embodiments, the placement device 130 may employ features such as a retention mechanism for retaining a tape along at least one of the first surface 132 and the second surface 134. The placement device 130 can include a retention mechanism for retaining a tape along at least one of the first surface 132 and the second surface 134 in addition to adhesion between the tape and at least one of the first surface 132 and the second surface 134. For example, the placement device 130 can include a vacuum system for retaining a tape along at least one of the first surface 132 and the second surface 134 by providing a negative air pressure (e.g. a pressure lower than atmospheric pressure) through the holes 139. The negative air pressure can exert a force between the tape and at least one of the first surface 132 and the second surface 134, which helps retain the tape on at least one of the first surface 132 and the second surface 134.

FIGS. 22A to 22C show a delivery system 170 in stages of an example delivery process that can be used with the placement device 130 and optionally the system 150 shown in FIG. 20, to apply an adhesive tape to an article. In some embodiments, the delivery system 140 includes a linear actuator 200, tape spool 201, a pressure roll 202, a knife 203, as shown in FIG. 22A. The delivery system 140 can be configured to move adhesive tape 110 to a position proximate to the placement device 130, and can stage the adhesive tape 110 in a suitable position for the placement device 130 to pick the tape 110 from the linear actuator 200. Linear actuators 200 are commonly used by those of skill in the art for shuttling articles such as tape, from a first location to a second location, such as along a manufacturing line. Some examples of suitable commercially available linear actuators include those sold under the model names EZS3 and MSA-14S (available from Oriental Motor and Macro Dynamics, Inc., located in Torrence, Calif.). Tape applicators are commonly used by those of skill in the art, and are useful for dispensing adhesive tapes from a tape supply. One example of a suitable commercially available tape applicator includes that sold under the model name T-627 (available from the Straub Design Company, located in St. Louis Park, Minn.).

FIG. 22A shows the delivery system 170 in a first position with the linear actuator 200 retracted and the pressure roll 202 raised with the adhesive tape 110 between the pressure roll 202 and linear actuator 200. The pressure roll 202 nips the adhesive tape 110 against the linear actuator 200 and the linear actuator 200 moves and pulls the tape 110 from the tape spool 201 in the direction of the placement device 130. Once the desired length of adhesive tape 110 has been positioned on the linear actuator 200, the adhesive tape 110 is cut by the knife 203 to form a section 211 of adhesive tape 110 and the pressure roll 202 is moved away from the linear actuator 200, as shown in FIG. 22B. The linear actuator 200 can be moved to a position proximate to the placement device 130. The placement device 130 then moves towards the linear actuator 200, as shown in FIG. 22C, until it contacts the section 211 positioned on the linear actuator 200 and activates an adhesive composition disposed along the first surface of the section 211 of adhesive tape 110. As previously disclosed, the placement device 130 moves from the linear actuator 200 with the section 211 of adhesive tape 130 adhered to it and applies the section 211 of adhesive tape 110 to an article. In some embodiments, the delivery system 170 includes a non-stick coating, for example a low surface energy coating such as polytetrafluoroethylene (PTFE), on suitable surfaces of the components of the delivery system 170, such as the linear actuator 200.

Figure 23A:
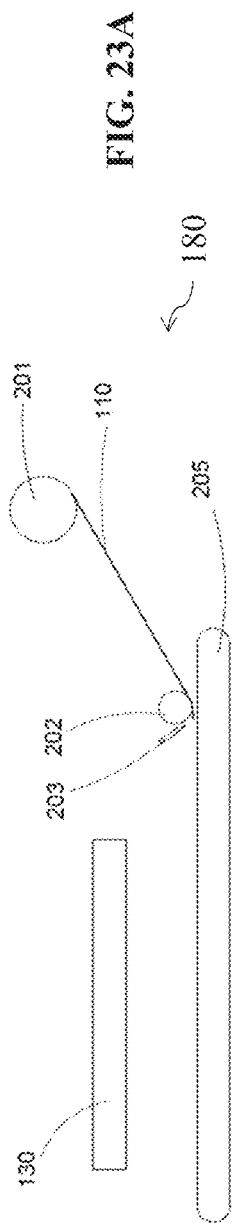
FIG. 23A to 23C are schematic views of a delivery system for providing an adhesive tape, in accordance with some embodiments.
Figure 23B:
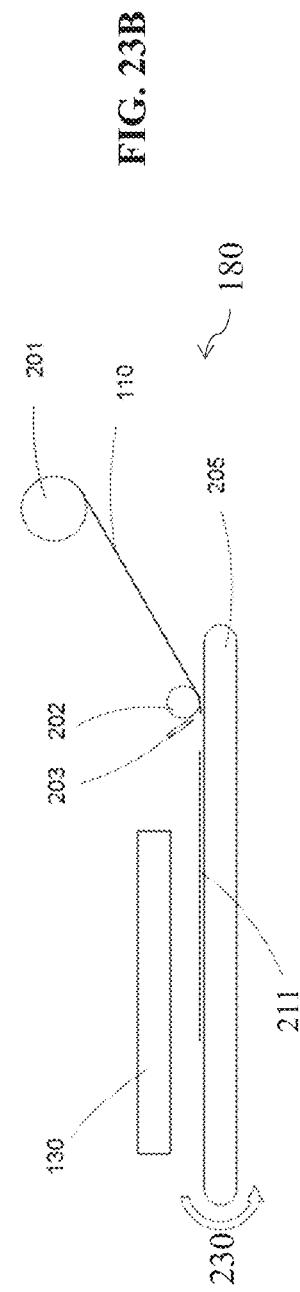
Figure 23C:
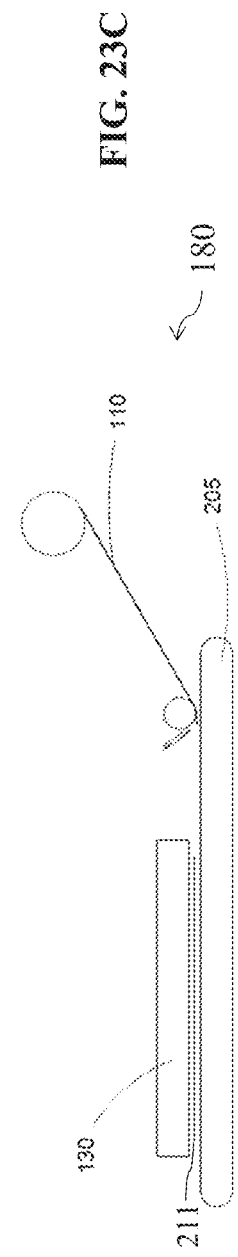

In another embodiment, a delivery system 180 can include the tape spool 201, pressure roll 202, knife 203, and a conveyor belt 205, as shown in FIG. 23A. The delivery system 180 can be configured to move the section 211 of adhesive tape 110 to a position proximate to the placement device 130, such that the placement device 130 can pick the section 211 of adhesive tape 110 from the conveyor belt 205. FIG. 23A shows the delivery system 180 in a first position with the pressure roll 202 separated from the conveyer belt 205 with the adhesive tape 110 positioned between the pressure roll 202 and conveyor belt 205. As shown in FIG. 23B, the pressure roll 202 can nip the adhesive tape 110 against the conveyor belt 205 to unwind a suitable length of adhesive tape 110. The conveyor belt 205 can rotate in the direction of the arrow 210 to move the length of adhesive tape 110 from the tape spool 201 toward the placement device 130. Once a suitable length of adhesive tape 110 has been positioned on the conveyor belt 205, the adhesive tape 110 can be cut by the knife 110 to form the section 211 of adhesive tape 110. The pressure roll 202 can then be moved away from the conveyor belt 205. In FIG. 23C the conveyor belt 205 has transported the section 211 of adhesive tape 110 to a position proximate the placement device 130. The conveyor belt 205 can be stopped such that the placement device 130 can pick the tape from the conveyor belt 205. As shown in FIG. 23C, the placement device 130 can move to contact the section 211 of adhesive tape 110 on the conveyor belt 205. The placement device 130 can activate an adhesive composition disposed on the first surface of the section 211 of adhesive tape 110. The placement device 130 can move away from the conveyor belt 205 with the adhesive tape 130 adhered to it and apply the section 211 of adhesive tape 110 to an article. In some embodiments, the delivery system 180 may include a non-stick coating, for example a low surface energy coating, on suitable surfaces of the components of the delivery system 180 such as the conveyer belt 205.

FIGS. 24A to 24C show a delivery system 190 that includes the tape spool 201, pressure roll 202, knife 203, tape applicator 204, and a conveyor belt 205, as similar to the system 180 of FIG. 23A. The delivery system 190 can move the adhesive tape 110 proximate to the placement device 130, such that the placement device 130 can pick the tape 110 from the conveyor belt 205 as shown in FIGS. 24A to 24C. The delivery system 190 can operate similar to the delivery system 180 outlined in FIG. 23A to 23C. However, as shown, the placement device 130 can move in any suitable direction or distance in relation to the conveyer belt 205 to pick up the adhesive tape 110 from the conveyor belt 205 and place it on an article.

In some embodiments, a delivery system 192 can include a conveyor belt 209 and cartridge feed system 206, as shown in FIGS. 25A to 25C. The cartridge feed system 206 is configured to deliver a section 212 of adhesive tape 110 that has been pre-cut cut to length, such as to form suitable strips or labels. The cartridge feed system 206 includes a feed-gate 207 and an actuator 208. The feed gate 207 is configured to allow a section 212 to be fed one at a time past the feed-gate 207 and to the conveyor belt 209. As shown in FIG. 24A, the linear actuator 208 extends to dispense a section 212 of adhesive tape 110 past the feed-gate 207. The linear actuator 208 advances the section 212 past the feed gate 207 and the conveyor belt 209 moves the section 212 from the cartridge feed system 206 in the direction of the placement device 130, as shown in FIG. 25B. The linear actuator 208 can be retracted once the section 212 is fully transferred to the conveyor belt 209. The conveyor belt 209 can stop such that the placement device 130 can pick the section 212 from the conveyor belt 209. As shown in FIG. 25C, the placement device 130 moves to contact the section 212 of adhesive tape 110 positioned on the conveyor belt 209. The placement device 130 can activate an adhesive composition disposed on the first surface of the adhesive tape 110. The placement device 130 can move away from the conveyor belt 209 with section 212 of adhesive tape 110 and apply it to an article. In some embodiments, the delivery system 192 includes a non-stick coating, on suitable surfaces of the components of the delivery system 192, such as the linear actuator 208 and/or the conveyor belt 209.

Figure 26A:
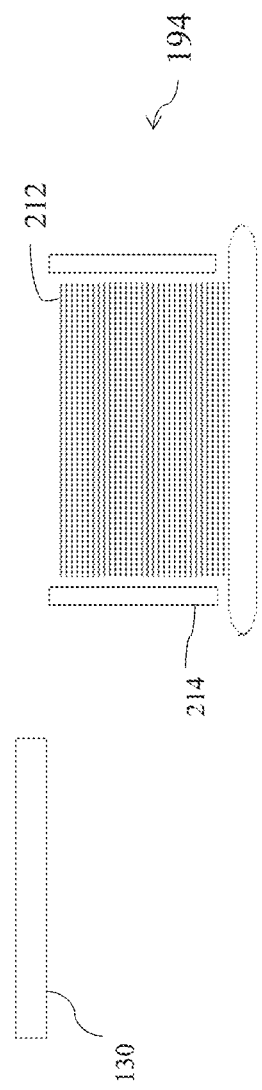
FIG. 26A to 26C are schematic views of a delivery system for providing an adhesive tape, in accordance with some embodiments.
Figure 26B:
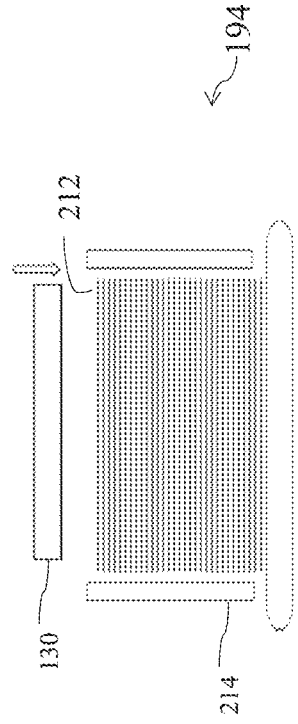
Figure 26C:
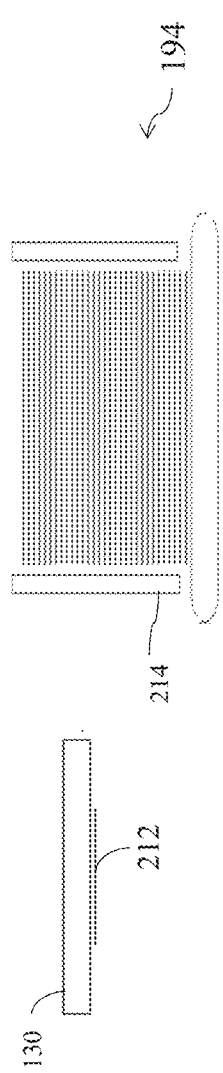

In some embodiments, a delivery system 194 can include a feed system 214, and can optionally be free of a conveyor belt, as shown in FIGS. 26A to 26C. The feed system 214 is configured to deliver a section 212 of adhesive tape 110 that has been pre-cut cut to length, such as to form suitable strips or labels. In some embodiments, the feed system 214 may be a container configured to hold more than one section 212 of adhesive tape 110 stacked within the container. As shown in FIG. 26A, the placement device 130 can move relative to the feed system 214. The placement device 130 can contact the section 212 of adhesive tape 110 that is in the feed system 214 and activate the section 212 of adhesive tape 110 such that it adheres to the placement device 130, as shown in FIG. 26B. The placement device 130 can pick up the section 212 of adhesive tape 110 move it relative to the feed system, as shown in FIG. 26C, for example to apply the section 212 of adhesive tape 110 to a surface of an article.

FIGS. 27A to 27B illustrate a delivery system 196 similar to that shown in FIGS. 22A to 22C, and including an optional moisture source 218 for activating an adhesive tape 110. The delivery system 196 can include the linear actuator 200, tape spool 201, a pressure roll 202, a knife 203, similar to that shown in FIG. 22A. The pressure roll 202 can nip the adhesive tape 110 against the linear actuator 200 and the linear actuator 200 can move and pull the tape 110 from the tape spool 201 in the direction of the placement device 130, as shown in FIG. 27A. The adhesive tape 110 contacts the moisture source 218 such as a first wetted roller 220 (e.g., at a nip between the first wetted roller and an optional second wetter roller 222), as shown in FIG. 27B, or a wetted brush which activates a moisture activatable adhesive composition of the adhesive tape 110. Once the desired length of activated adhesive tape 110 has been positioned on the linear actuator 200, the adhesive tape 110 can be cut by the knife 203 to form a section 211 of adhesive tape 110, as shown in FIG. 27B. The linear actuator can move the section 211 to be picked up by the placement device, as shown in FIG. 27C.

EXAMPLES

The following non-limiting examples are included to further illustrate various embodiments and are not intended to limit the scope of the instant disclosure.

In a first example, a carrier substrate formed from 2 mil thick PET film was coated with an ethylene-vinyl acetate (EVA) based hot melt adhesive on both sides. The hot melt adhesive had a softening point of 254 OF (123° C.) and a tack point of 166° F. (74° C.). The coated film was slit to make a 12.5 mm wide tape and traverse wound onto a 3.25 inch (8.26 cm) core. A length of tape was dispensed onto a metal shuttle and a first surface of the tape was contacted by a placement device that included a heated bar. The heated bar had a surface with a temperature of about 350° F. (177° C.). The tape stuck to the surface of the heated bar. The placement device moved the tape from the shuttle and contacted the second opposing side of the tape to a surface of a side panel of a box made from corrugated cardboard. The box had a top panel formed from corrugated cardboard and a flap contiguous with the top panel extended over the side panel and overlapped a surface of the side panel. The placement device was separated from the tape and the tape remained in contact with the side panel of the box. After the placement device was separated from the tape, the flap was contacted to the first side of the tape and the tape joined the flap to the side panel of the box.

This same process was used to test application of tapes formed with hot melt adhesives having melting points from about 185° F. (85° C.) to about 260° F. (127° C.). The same process was used to sample tapes having hot melt adhesives with tack points from about 150° F. (66° C.) to about 220° F. (104° C.). The same process was used to test application of tapes having widths from about 11 to about 20 mm wide.

The boxes closed with the tapes disclosed above were placed into an oven maintained at about 122° F. (50° C.) and left there for 5 days. All boxes closed with a tape having a hot melt adhesive with a melting point higher than 195° F. (91° C.) remained closed after 5 days.

The bonds of the tapes that were used to close the sample boxes were tested for heat resistance with static load under a combination of peel and shear stress with a dynamic temperature increase. All tests substantially followed the procedure provided by the Institute of Packaging Professionals (available at: IoPP Adhesion Committee, IoPP Technical Journal, "Suggested Procedure for Evaluating the Heat Stress Resistance of Hot Melt Adhesives", Vol. X, Number 1, p. 7-9, Winter—1992. 2. Heat Stress Test Method. Eastman Adhesives Procedure No. 7340-006, Edition 1, Jul. 12, 1993.) All bonds formed with tapes having a hot melt adhesive with a melt point greater than about 235° F. (113° C.) had bonds that survived testing performed at 130° F. (54° C.).

In view of the many possible embodiments to which the principles of the disclosed invention may be applied, it should be recognized that the illustrated embodiments are only examples of the invention and should not be taken as limiting the scope of the invention. Various modifications and additions can be made to the exemplary embodiments discussed without departing from the scope of the present invention. For example, while the embodiments described above refer to particular features, the scope of this invention also includes embodiments having different combinations of features and embodiments that do not include all of the above described features.

What is claimed is:

1. A method of applying a tape to an article, the method comprising:
    contacting a first activatable adhesive composition of an adhesive tape with a placement device having a heated surface, the adhesive tape having a carrier substrate, the first activatable adhesive composition disposed on a first surface of the carrier substrate, and a second activatable adhesive composition disposed on a second surface of the carrier substrate;
    activating the first activatable adhesive composition through contact with the heated surface of the placement device such that the adhesive tape adheres to the placement device through the first activatable adhesive composition;
    separating the adhesive tape from a tape delivery system;
    activating the second activatable adhesive composition through contact of the heated surface of the placement device with the first activatable adhesive composition;
    contacting an article with the second activatable adhesive composition; and
    separating the placement device from the adhesive tape such that the adhesive tape remains adhered to the article.

2. The method of claim 1, wherein the article is a container having a first panel, a second panel, and a flap contiguous with the first panel, and contacting the article with the second activatable adhesive composition includes contacting at least one of the second panel and the flap with the second activatable adhesive composition.

3. The method of claim 2, further comprising contacting the first adhesive composition with the other of the second panel and the flap such that the second panel is bonded to the flap through the adhesive tape.

4. The method of claim 1, wherein contacting an article with the second activatable adhesive composition includes contacting a first surface of the article and a second surface of the article with the second activatable adhesive composition.

5. The method of claim 1, wherein separating the adhesive tape from the tape delivery system includes retaining the adhesive tape on the placement device only by adhesion of the first activatable adhesive composition to a first surface of the placement device.

6. The method of claim 1, wherein activating the first activatable adhesive composition includes heating the first activatable adhesive composition such that the first activatable adhesive composition becomes tacky.

7. The method of claim 1, wherein activating the second activatable adhesive composition includes heating the second activatable adhesive composition such that the second activatable adhesive composition becomes tacky.

8. A method of applying a tape to an article, the method comprising:
    contacting an adhesive tape with a placement device, the adhesive tape including a carrier substrate having a first surface and an opposing second surface, a first activatable adhesive composition disposed on the first surface of the carrier substrate, and a second activatable adhesive composition disposed on the second surface of the carrier substrate;
    activating the first activatable adhesive composition by heating the first activatable adhesive composition through direct contact with the placement device such that the first surface of the adhesive tape adheres to the placement device through the first activatable composition;
    activating the second activatable adhesive composition by heating the second activatable adhesive composition through direct contact of the first activatable adhesive composition with the placement device;
    contacting an article with the second activatable adhesive composition; and
    separating the placement device from the first activatable adhesive composition such that the second activatable adhesive composition remains in contact with the article and the placement device separates from the adhesive tape.

9. The method of claim 8, wherein the article is a container having a first panel, a second panel, and a flap contiguous with the first panel; and the method further comprises contacting at least one of the flap and the second panel with the second activatable adhesive composition.

10. The method of claim 9, father comprising contacting the other of the flap and the second panel with the first activatable adhesive composition such that the second panel is bonded to the flap through the adhesive tape.

11. The method of claim 8, wherein separating the placement device from the first activatable adhesive composition includes providing positive air pressure between the placement device and the first activatable adhesive composition.

* * * * *